United States Patent
Bajpai et al.

(10) Patent No.: US 9,590,441 B2
(45) Date of Patent: Mar. 7, 2017

(54) MULTI-STANDARD COMPLIANT USB BATTERY CHARGING SCHEME WITH DETECTION OF HOST DISCONNECTION IN ACA-DOCK MODE

(71) Applicant: Cypress Semiconductor Corporation, San Jose, CA (US)

(72) Inventors: Pradeep Kumar Bajpai, Sunnyvale, CA (US); Sanjeev Dwarakanath, Bangalore (IN); Jitendra Ramkrishna Kulkarni, San Jose, CA (US); Rishi Agarwal, Santa Clara, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 0 days.

(21) Appl. No.: 14/750,555

(22) Filed: Jun. 25, 2015

(65) Prior Publication Data

US 2016/0028252 A1 Jan. 28, 2016

Related U.S. Application Data

(60) Provisional application No. 62/027,352, filed on Jul. 22, 2014.

(51) Int. Cl.
*H02J 7/00* (2006.01)

(52) U.S. Cl.
CPC ............ *H02J 7/007* (2013.01); *H02J 7/0029* (2013.01); *H02J 7/0052* (2013.01); *H02J 2007/0062* (2013.01)

(58) Field of Classification Search
CPC ...................................................... H02J 7/007
USPC .......................................... 320/103, 106, 160
See application file for complete search history.

(56) References Cited

U.S. PATENT DOCUMENTS

| | | | |
|---|---|---|---|
| 8,362,741 B2* | 1/2013 | Capella ................ | H02J 7/0004 320/107 |
| 8,386,814 B2 | 2/2013 | Tom et al. | |
| 8,723,476 B2 | 5/2014 | Helfrich | |
| 8,769,317 B2* | 7/2014 | Shih ...................... | H01M 10/44 455/573 |
| 8,819,301 B2 | 8/2014 | Lai et al. | |
| 9,047,808 B2* | 6/2015 | Cho ...................... | G09G 3/2092 |
| 2010/0070659 A1* | 3/2010 | Ma ........................ | G06F 13/385 710/14 |

(Continued)

OTHER PUBLICATIONS

Genesys Logic, "GL888E USB Host Charging Controller"; 1 page.

(Continued)

*Primary Examiner* — Richard V Muralidar

(57) ABSTRACT

Techniques for controlling the charging of portable devices are described herein. In an example embodiment, an apparatus comprises a controller coupled to a Universal Serial Bus (USB) port that is configured as a dedicated charging port (DCP). The controller is configured to detect whether a battery-charging (BC) compliant device or a BC non-compliant device is attached to the USB port. When a BC compliant device is detected, the controller controls the charging of the BC compliant device (e.g., by providing a maximum of 1.5 A of charging current). When a BC non-compliant device is detected, the controller controls the charging of the BC non-compliant device by providing a higher (e.g., up to 2.4 A) charging current.

20 Claims, 11 Drawing Sheets

(56) References Cited

U.S. PATENT DOCUMENTS

| | | |
|---|---|---|
| 2011/0057604 A1* | 3/2011 | Capella ................ H02J 7/0004 320/107 |
| 2011/0221388 A1 | 9/2011 | Low et al. |
| 2013/0113415 A1 | 5/2013 | Chen et al. |
| 2013/0234655 A1 | 9/2013 | Miwa et al. |
| 2015/0035477 A1 | 2/2015 | Wong et al. |

OTHER PUBLICATIONS

Mannil, Hasib: "Implementing Battery Charging Features Using HX3", Cypress Application Note AN92554, 2014; 29 pages.

SMSC, "USB Battery Charging with the Microchip/SMSC USB2534 Hub Controller", Application Note 26.19, dated Jun. 19, 2013; 24 pages.

Texas Instruments, "BQ24392 Dual SPST USB 2.0 High Speed Switch with USB Battery Charging Specification Revision 1.2 Detection", dated Jun. 2012, revised Jan. 2016; 22 pages.

\* cited by examiner

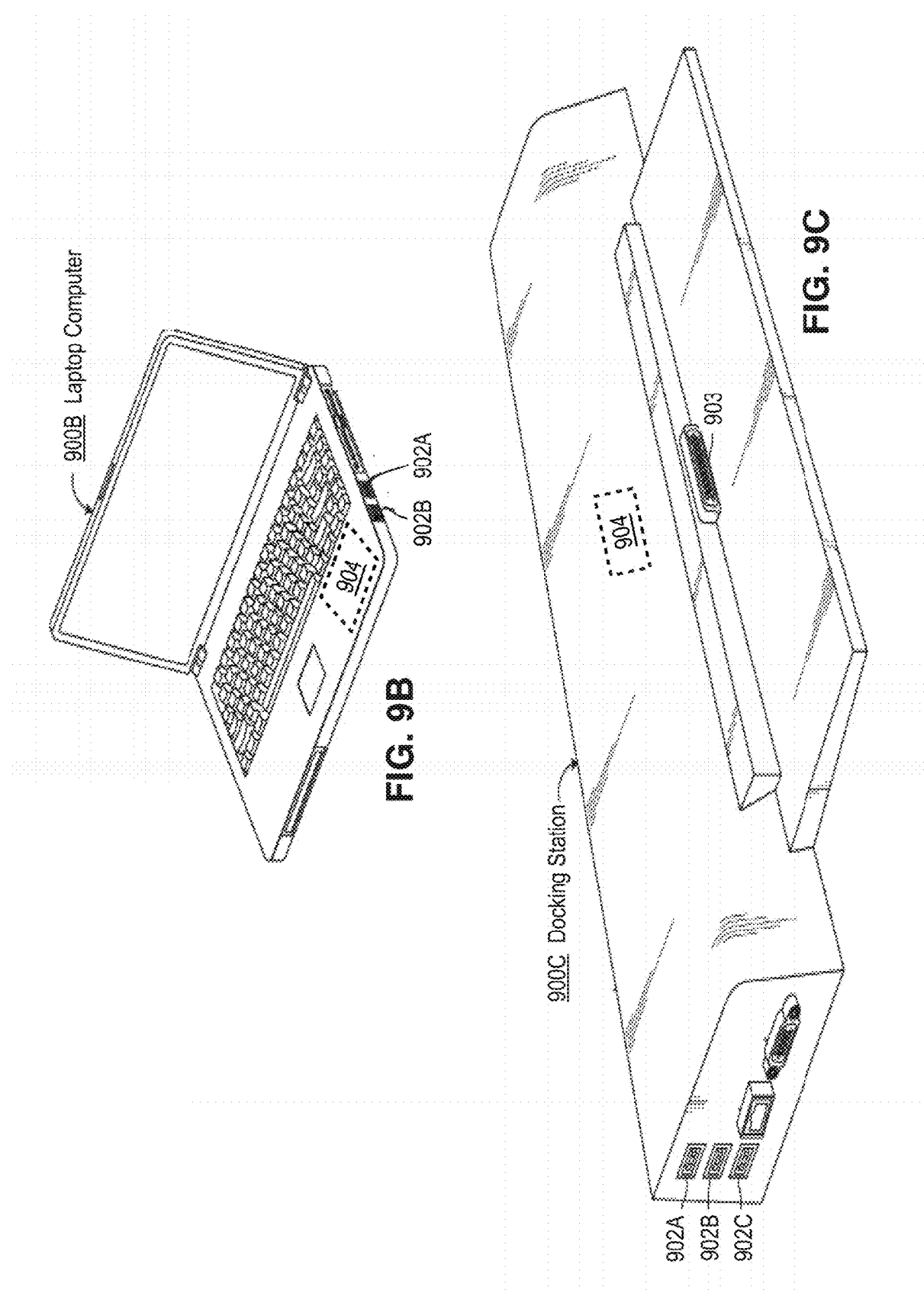

1

MULTI-STANDARD COMPLIANT USB BATTERY CHARGING SCHEME WITH DETECTION OF HOST DISCONNECTION IN ACA-DOCK MODE

PRIORITY

This application claims the priority and benefit of U.S. Provisional Application No. 62/027,352, filed on Jul. 22, 2014, the entire content of which is incorporated by reference herein.

TECHNICAL FIELD

This disclosure generally relates to the field of battery charging for portable devices.

BACKGROUND

Various portable electronic devices (e.g., such as smart phones, cell phones, tablets, etc.) utilize power provided by batteries and typically provide interfaces for recharging their batteries. Some types of popular battery charging interfaces may be related to a given battery charging specification. For example, the Battery Charging Specification, Revision 1.2 (published on Dec. 7, 2010) defines limits and control mechanisms to permit portable devices to draw currents in excess of the limits specified in a Universal Serial Bus (USB) specification, e.g., such as the USB Specification Revision 2.0 (published on Apr. 27, 2000).

Users have many options to charge their portable devices via USB ports on charging devices (e.g., such as computers, hubs, docking stations, wall chargers, car chargers, etc.), and typically better user experience is defined by shorter charging times. To this end, some device manufacturers have developed portable devices and charging mechanisms that are not compliant with the battery charging specification(s). The existence in the market of such portable devices, however, presents various problems for manufacturers of charging equipment. For example, it is very difficult to develop a charging device that can charge most or all of the portable devices available in the market at the maximum limits allowed by the devices' respective (and possibly non-compliant) charging mechanisms, while at the same time being user-friendly by not requiring the user to select a certain type of USB port on the charging device.

BRIEF DESCRIPTION OF THE DRAWINGS

FIG. 9B-9E illustrate example devices that may include the USB controller of FIG. 9A, according to example embodiments.

DETAILED DESCRIPTION

Figure 1:
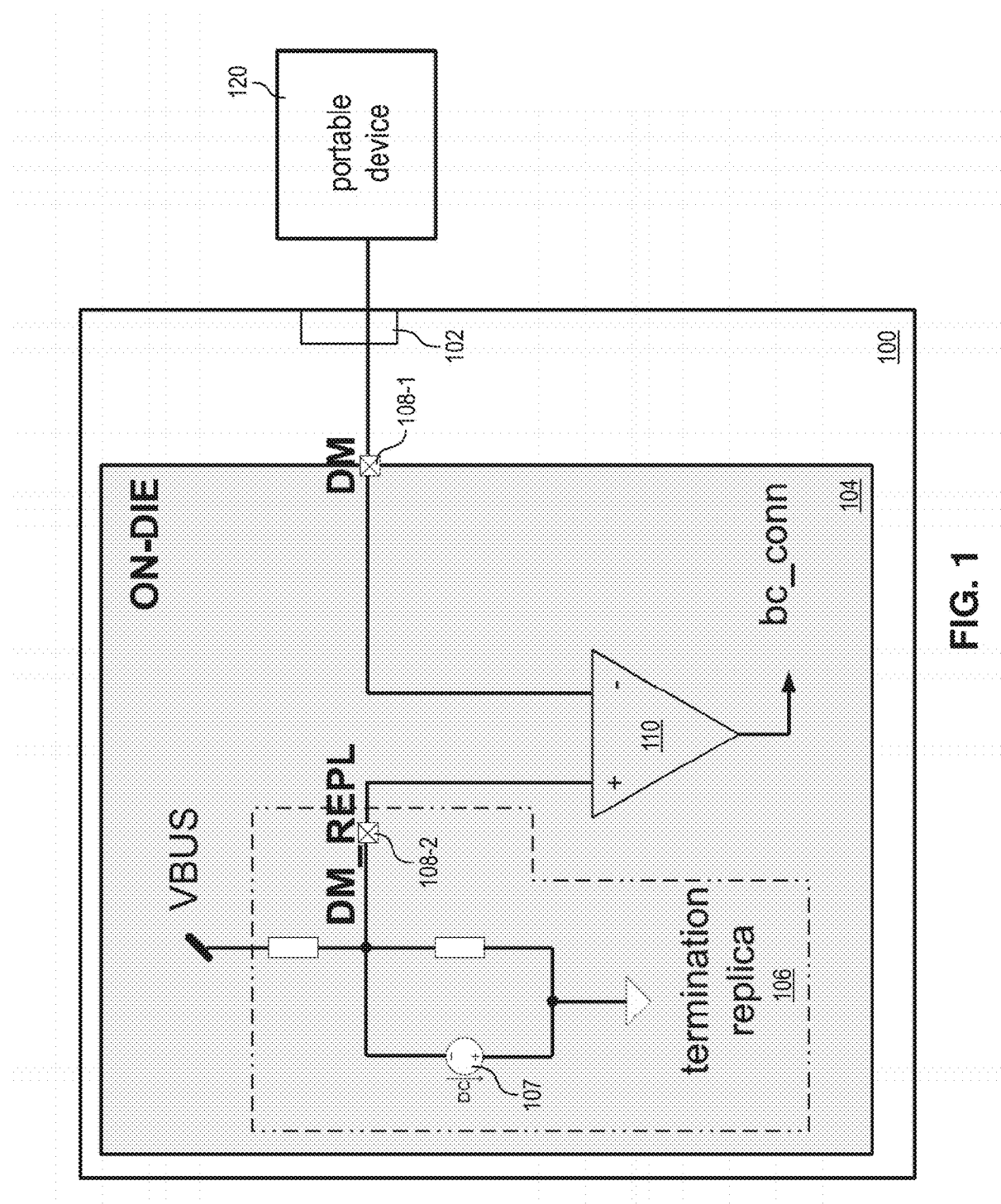
FIG. 1 illustrates an example controller configured for Level-1 detection of battery-charging compliant portable devices, according to some embodiments.

The following description sets forth numerous specific details such as examples of specific systems, components, methods, and so forth, in order to provide a good understanding of various embodiments of the techniques described herein for controlling the charging of portable devices. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely exemplary. Particular implementations may vary from these exemplary details and still be contemplated to be within the spirit and scope of the present invention.

Reference in the description to "an embodiment", "one embodiment", "an example embodiment", "some embodiments", and "various embodiments" means that a particular feature, structure, or characteristic described in connection with the embodiment(s) is included in at least one embodiment of the invention. Further, the appearances of the phrases "an embodiment", "one embodiment", "an example embodiment", "some embodiments", and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Overview

Described herein are various embodiments of techniques for controlling the charging of portable devices. Examples of such portable devices include, without limitation, tablets and tablet computers, e-reader devices, mobile communication devices (e.g., smart phones, cell phones, personal digital assistants, messaging devices, pocket PCs, etc.), wearable devices (e.g., smart watches, smart glasses, fitness bands, activity trackers, fashion electronics, etc.), audio/video/data recording and/or playback devices (e.g., cameras, voice recorders, hand-held scanners, monitors, etc.), and other similar electronic devices that can use battery-provided power to operate.

Some portable devices may be compliant with a given battery charging specification, while other portable devices may be non-compliant with such battery charging specification. As used herein, a portable device is referred to as "battery-charging" ("BC") compliant if the portable device complies with the requirements for dedicated charging specified in a BC specification. A portable device is referred to as BC non-compliant if the portable device does not comply with the requirements for dedicated charging specified in a BC specification. For example, a portable device is BC compliant if the portable device substantially complies at least with the limits that are imposed on drawing a charging current as specified in a BC specification. Alternatively, a portable device is BC non-compliant if the portable device does not substantially comply at least with the limits that are imposed on drawing a charging current as specified in the BC specification. One example of such BC specification is the Battery Charging Specification, Revision 1.2 (BC1.2) that was published by the USB Implementers Forum (USB-IF) on Dec. 7, 2010. According to the BC1.2 specification, 1.5 A is the maximum charging current that a portable device can draw to charge its batteries.

Some battery charging specifications (e.g., such as BC1.2) are closely related to USB Specifications such as, for example, the USB Specification Revision 2.0 (USB 2.0, published by USB-IF on Apr. 27, 2000), the USB 3.0 Specification Revision 1.0 (USB 3.0, published by USB-IF on Nov. 12, 2008), and the USB 3.1 Specification Revision 1.0 (USB 3.1, published by USB-IF on Jul. 26, 2013). The USB specifications generally define the characteristics (e.g., attributes, connector types, protocol definition, types of transactions, bus management, programming interfaces, etc.) of a differential serial bus that are required to design and build standard communication systems and peripherals. For example, a peripheral device (e.g., such as a portable device) attaches to a host device through a USB connector (e.g., a USB cable) that is plugged into a USB port of the host device. A USB 2.0 port includes a power line of 5V (denoted VBUS), two data lines (denoted D+ or DP, and D− or DM), and a ground line (denoted GND). For backward compatibility with USB 2.0, a USB 3.0 port also provides the VBUS, D+, D−, and GND lines. Thus, a portable device can conveniently charge its battery by drawing current from the VBUS line of a USB 2.0/3.0 port on a device such as a computer, hub, docking station, AC charger, car charger, etc.

To permit portable devices to charge their batteries in a standard manner, the BC1.2 specification defines the maximum average current limits of several different types of USB ports:

dedicated charging port (DCP)—this USB port can supply a maximum of 1.5 A of charging current to an attached portable device, but while charging the port does not participate in USB traffic (e.g., without completing USB enumeration to configure the portable device for USB communication);

charging downstream port (CDP)—this USB port can supply a maximum of 1.5 A of charging current to an attached portable device while participating in USB traffic (e.g., after USB enumeration is completed and the portable device is configured for USB communication);

standard downstream port (SDP)—this USB port can supply a charging current of a maximum of 500 mA (per the USB 2.0 specification) or 900 mA (per the USB 3.0 specification) to an attached portable device while participating in USB traffic (e.g., after USB enumeration is completed and the portable device is configured for USB communication).

In addition, the BC1.2 specification defines several Accessory Charger Adapter (ACA) operational modes. One example of such operational modes is the ACA-Dock mode, in which a USB hub provides a VBUS line to an upstream host device so that the host device may draw current from the VBUS line to operate and/or to charge its batteries. (It is noted that according to the USB specifications, it is the host device that must provide current on the VBUS line in a host-peripheral USB system).

Some manufactures provide portable devices that are compliant with the BC1.2 specification, which allows charging devices from one manufacturer to be interoperable with portable devices by another manufacturer. Other manufacturers, however, provide portable devices that are not compliant with the BC1.2 specification but are otherwise compatible with the USB specifications for transfer of data. For example, one specific manufacturer provides popular smart phones that are configured to draw up to 2.4 A of charging current from a USB port that is otherwise compliant with the USB communication standards. While the capability to draw higher charging current allows these BC non-compliant devices to charge their batteries faster, the presence of this capability causes some problems. For example, a user must make sure to plug such BC non-compliant device into a USB port on a BC non-compliant charging device provided or supported by the specific manufacturer in order to get the faster charging time. The user, however, must make sure not to plug a BC compliant device (e.g., from another manufacturer) in the same USB port of the BC non-compliant charging device because the BC compliant device may be provided with more charging current it is designed to handle, thereby causing various undesirable effects such as circuit burnouts and battery overheating. In another example, the availability in the market of portable devices with the capability to draw higher charging currents than allowed in the BC1.2 specification presents a design problem for charging equipment manufacturers. For instance, charging equipment manufacturers face tough challenges and increased bill of materials (BOM) in designing charging devices that can charge most or all of the portable devices available in the market at the maximum limits allowed by the devices' respective (and possibly non-compliant) charging mechanisms, while at the same time being user-friendly by not requiring the user to select a certain type of USB port on the charging device.

To address these and other problems, the techniques for controlling the charging of portable devices described herein provide for detecting whether a BC compliant device or a BC non-compliant device is attached to a dedicated charging USB port of a charging device. In some embodiments, a dedicated charging USB port on a charging device is configured in default mode to provide charging current to a BC non-compliant device. When a portable device is attached to the USB port, the charging device is configured to detect whether the attached device is BC compliant. For example, a controller of the charging device may include an on-die hardware replica to mimic the state of the D− line of the USB port when a BC compliant device is not attached and/or connected and to provide a clear differentiator signal that can be detected when a BC compliant device is attached/connected or disconnected. This allows these embodiments to support charging of both BC non-compliant devices and BC compliant devices dynamically (e.g., on-the-fly during operation) and seamlessly to a user (e.g., a user does not need to select a certain type of USB port on the charging device). For instance, if the charging device determines that a portable device attached to a dedicated charging port is BC compliant, the controller in the charging device provides a maximum average of 1.5 A of charging current (e.g., per the BC1.2 specification) to charge the portable device. Otherwise, if the charging device determines that the attached portable device is BC non-compliant, the controller charges the portable device by providing a higher average charging current (e.g., up to 2.4 A) that is configured according to the default mode.

In addition, some embodiments may further provide for detecting the disconnection of a host device from an upstream USB port of a docking station or hub based on the D+ and/or D− lines of the port, instead of based on the VBUS line as defined in the BC1.2 specification. This allows these embodiments to detect the host device disconnection when the VBUS line is asserted in the ACA-Dock mode of the docking station or hub. For example, some embodiments may use an on-die hardware replica of the D+ line that is compared with the live D+ line of the upstream USB port during USB "Suspend" mode. The output signal of the comparison deterministically changes when the host device is present in the ACA-Dock mode on the upstream USB port versus when the host device is not present. This allows these embodiments to switch any downstream communication USB ports (e.g., such as CDPs and SDPs) of a docking station or hub to dedicated charging mode when the host device is disconnected. Without the techniques described herein, any downstream USB ports dedicated for charging (e.g., DCPs) must be configured at the time a USB hub or docking station is manufactured and cannot be used for normal USB data communication when a host device is connected to the upstream USB port of the hub or docking station in ACA-Dock mode.

In an example embodiment, an apparatus comprises a controller coupled to a USB port that is configured as a dedicated charging port (e.g., DCP). The controller is configured to detect whether a BC compliant device or a BC non-compliant device is attached to the USB port. For example, the controller can detect the BC compliant device or the BC non-compliant device based on whether or not a current sink is activated on a data line of the USB port. When a BC compliant device is detected, the controller controls the charging of the BC compliant device (e.g., by providing a maximum average of 1.5 A of charging current per the BC1.2 specification). When a BC non-compliant device is detected, the controller controls the charging of the BC non-compliant device by providing a higher average charging current (e.g., up to 2.4 A) than allowed in the BC1.2 specification. In this embodiment, the controller may be an integrated circuit (IC) in a single-die chip. In an example aspect of this embodiment, the apparatus may further comprise a docking station that includes an upstream USB port, where the dedicated charging USB port is a downstream USB port of the docking station and where the controller may be further configured to detect whether a host device is disconnected from the upstream USB port independently of the status of a VBUS line of the upstream USB port. In this aspect, the controller may further re-configure the downstream USB port of the docking station as a communication USB port (e.g., SDP or CDP) when the host device is attached to the upstream USB port, and to re-configure the downstream USB port as a dedicated charging port (e.g., DCP) when the host device is disconnected from the upstream USB port.

In an example embodiment, a device is an IC on a single-die chip and comprises a Level-1 detection circuit and a charging circuit. The Level-1 detection circuit is configured to detect whether a BC compliant device or a BC non-compliant device is attached to a dedicated charging USB port (e.g., DCP). For example, the Level-1 detection circuit can detect the BC compliant device or the BC non-compliant device based on whether or not a current sink is activated on a data line of the USB port. When a BC compliant device is detected, the charging circuit charges the BC compliant device (e.g., by providing a maximum average of 1.5 A of charging current per the BC1.2 specification). When a BC non-compliant device is detected, the charging circuit charges the BC non-compliant device by providing a higher average charging current (e.g., up to 2.4 A) than allowed in the BC1.2 specification. In an example aspect of this embodiment, the Level-1 detection circuit includes a voltage source coupled to a replica node of on-die elements that terminate a D− line of the dedicated charging USB port. In another example aspect, the device further comprises a Level-2 detection circuit configured to confirm detection of the BC compliant device when the Level-1 detection circuit detects that the BC compliant device is attached to the USB port. The Level-2 detection circuit is configured to disconnect components, coupled at least to the D+ line, that are configured to support BC non-compliant device charging, and to connect a current sink to the D+ line to discharge any spurious charge thereon. In another example aspect, the device may further comprise a detection circuit that includes a switch coupled between a ground and a D− line of the dedicated charging USB port and that is configured to detect a disconnection of the BC compliant device from the USB port. In another example aspect, the device may further comprise a detection circuit and a re-configuration circuit. The detection circuit includes a replica node of on-die elements that terminate a D+ line of an upstream USB port and is configured to detect whether a host device is disconnected from the upstream USB port. The re-configuration circuit re-configures a downstream USB port as a communication USB port (e.g., SDP or CDP) when the host device is connected to the upstream USB port, and re-configures the downstream USB port as a dedicated charging port (e.g., DCP) when the host device is disconnected from the upstream USB port.

In an example embodiment, a method comprises: detecting whether a BC compliant device or a BC non-compliant device is attached to a downstream USB port based on whether or not a current sink is activated on a data line of the USB port, where the USB port is configured as a dedicated charging port (e.g., DCP); charging the BC compliant device when the BC compliant device is detected (e.g., by providing a maximum average of 1.5 A of charging current per the BC1.2 specification); and charging the BC non-compliant device when the BC non-compliant device is detected (e.g., by providing a higher average charging current than allowed in the BC1.2 specification). In an example aspect of this embodiment, the method further comprises confirming detection of the BC compliant device at least by: disconnecting components, coupled at least to a D+ line of the downstream USB port, that are configured to support BC non-compliant device charging; connecting a current sink to the D+ line and waiting a first time interval; and disconnecting the current sink from the D+ line and waiting a second time interval. In another example aspect, the method may further comprise detecting a disconnection of the BC compliant device from the downstream USB port. In another example aspect, the method may further comprise: detecting whether a host device is disconnected from an upstream USB port independently of the status of a VBUS line of the upstream USB port; re-configuring the downstream USB port as a communication USB port (e.g., SDP or CDP) when the host device is connected to the upstream USB port; and re-configuring the downstream USB port as a dedicated charging port (e.g., DCP) when the host device is disconnected from the upstream USB port.

Level-1 (Primary) Detection

In some embodiments, the techniques described herein provide for detecting whether a BC compliant device or a BC non-compliant device is attached to a USB port of an apparatus, e.g., such as a hub or a docking station. This is referred to herein as Level-1 detection.

FIG. 1 illustrates an example device 100 that is configured for Level-1 detection. In various embodiments, device 100 may be an apparatus such as a laptop computer, notebook computer, a docking station, a standalone USB hub, or any other similar device that is capable of charging portable devices. Device 100 includes a USB port 102 that is coupled to controller 104. USB port 102 may be a USB 2.0 or a USB 3.0 port.

In the embodiment illustrated in FIG. 1, controller 104 is an integrated circuit (IC) chip manufactured on a single die. Controller 104 may be USB hub controller or other equivalent USB controller that can be configured to control charging of portable devices through USB ports. In an example embodiment, controller 104 may be a single-chip IC device from the HX3 family of USB hub controllers that are developed by Cypress Semiconductor Corporation, San Jose, Calif.

Among other hardware elements needed to process USB traffic, controller 104 also includes a Level-1 detection circuit that comprises D− node 108-1, termination replica 106, and comparator 110. The D− node 108-1, termination replica 106, and comparator 110 are configured in accordance with the techniques described herein to perform Level-1 detection. The D− node 108-1 is coupled to the D− line of USB port 102 and is configured to transmit and receive the D− signals of a USB bus. Termination replica 106 includes a replicated D− node 108-2, which is coupled to voltage source 107 and to a resistor divider coupled to the VBUS line of the USB bus. The D− node 108-2 is an exact hardware replica of the D− node 108-1. For example, the D− node 108-2 includes exact copies of the same hardware elements (e.g., buffers, amplifiers, resistors, etc.) that are included in the D− node 108-1; thus, the electrical characteristics (e.g., impedance, capacitance, leakage, etc.) of the D− node 108-2 are matched exactly to the electrical characteristics of D− node 108-1. The negative input terminal of comparator 110 is coupled to the D− node 108-1 and the positive input terminal of comparator 110 is coupled to the D− node 108-2 of termination replica 106. In operation, according to the techniques described herein, the output terminal (e.g., "bc_conn") of comparator 110 transitions to a high output signal to indicate that a BC compliant device is attached to USB port 102 or maintains a low output signal to indicate that BC non-compliant device is attached to the USB port 102.

In the embodiment of FIG. 1, termination replica 106 and comparator 110 are manufactured on the same die as controller 104. In this regard, it is noted that manufacturing termination replica 106 and comparator 110 on the same die as controller 104 has several advantages over manufacturing equivalent termination replica and comparator on a printed circuit board (PCB) or on a different chip in a multi-chip module. For example, one advantage of a single-die embodiment is that the replicated D− node 108-2 can be manufactured to exactly match the electrical characteristics of the regular D− node 108-1. In contrast, it is very difficult (if at all possible) to exactly match the electrical characteristics of the D− node on the die of the controller to the electrical characteristics of a replica D− node manufactured on a PCB or in a different die of a multi-chip module. Another advantage of manufacturing termination replica 106 and comparator 110 on the same die as controller 104 is that such single-die embodiment reduces the bill of materials (BOM) that is needed to manufacture a USB-enabled apparatus such as a hub, docking station, or USB-based charging device. In contrast, using a comparator, a termination replica, and other necessary hardware elements (e.g., resistors, capacitors, etc.) that are disposed on a separate PCB or die increases the BOM since these elements are separate parts.

In operation, controller 104 is configured in a default mode that is specified in the firmware configuration and/or registers of the controller. In the default mode, USB port 102 is configured as a dedicated charging port (DCP) and voltage source 107 of termination replica 106 is configured to process a current of less than 25 µA to ground. When no device is attached to USB port 102, the voltage source 107 pulls down the voltage on the replicated D− node 108-2 so that it is lower than the voltage on the regular D− node 108-1. As a result, in the default mode comparator 110 maintains a low output signal (e.g., a logical "0") at its output terminal. When a portable device 120 is physically attached (e.g., through a USB cable) to USB port 102 of device 100, controller 104 detects the attachment and performs Level-1 detection according to the techniques described herein.

Specifically, when the attached portable device 120 is BC compliant, the portable device 120 activates a current sink with an IDM_SNK current on the D− line of the USB bus in accordance with the BC1.2 specification, per which the IDM_SNK current must be between 25 µA and 175 µA. By virtue of the D− line of USB port 102, the activation of a current sink with the IDM_SNK current on portable device 120 pulls the voltage on the regular D− node 108-1 of controller 104 lower than the voltage on the replicated D− node 108-2 provided by voltage source 107. Thus, the voltage on the negative terminal of comparator 110 is lower than the voltage on the positive input terminal, and as a result the output of comparator 110 transitions to a high output signal (e.g., a logical "1"). Controller 104 detects the transition to the high output signal and determines that a BC compliant device has been attached to USB port 102. This causes controller 104 to provide for a BC compliant charging current to portable device 120. For example, controller 104 may cause a power supply in device 100 to provide a charging current of a maximum of 1.5 A to portable device 120 over the VBUS line of the USB bus.

When the attached portable device 120 is BC non-compliant, the portable device 120 does not activate a current sink with an IDM_SNK current or an equivalent on the D− line of the USB bus. Hence, by virtue of the D− line of USB port 102, the voltage on the regular D− node 108-1 of controller 104 stays higher than the voltage on the replicated D− node 108-2. Thus, the voltage on the negative input terminal of comparator 110 is higher than the voltage on the positive input terminal, and as a result the output of comparator 110 maintains a low output signal (e.g., a logical "0"). Controller 104 detects the lack of transition to a high output signal at the output of comparator 110, and determines that a BC non-compliant device has been attached to USB port 102. This causes controller 104 to provide for a BC non-compliant charging current to portable device 120. For example, controller 104 may cause a power supply in device 100 to provide a charging current of a maximum of 2.4 A to portable device 120 over the VBUS line of the USB bus.

In some embodiments, performing Level-1 detection as described herein may be sufficient (e.g., to a certain degree of confidence) to detect whether a BC compliant device or a BC non-compliant device is attached to a dedicated charging USB port. In some embodiments, however, the presence of parasitic leakages may cause a false transition to a high signal to be generated at the output terminal of the comparator, which would falsely indicate that a BC compliant device has been attached to the USB port. In these embodiments, to eliminate a false detection of a BC compliant device, Level-2 detection may be performed as described below.

Level-2 (Secondary) Detection

In some embodiments, the techniques described herein provide for confirming the detection of a BC compliant device after a controller or a circuit thereof has already detected that a BC compliant device is attached to a USB port configured as dedicated charging port (DCP). This is referred to herein as Level-2 detection. The Level-2 detection is used to guard against a false positive detection of BC compliant device made by a Level-1 detection circuit in a USB controller. Such false positive detection of a BC compliant device may be caused by spurious and/or parasitic current leakages in hardware components of the controller and/or of the attached portable device.

Figure 2:
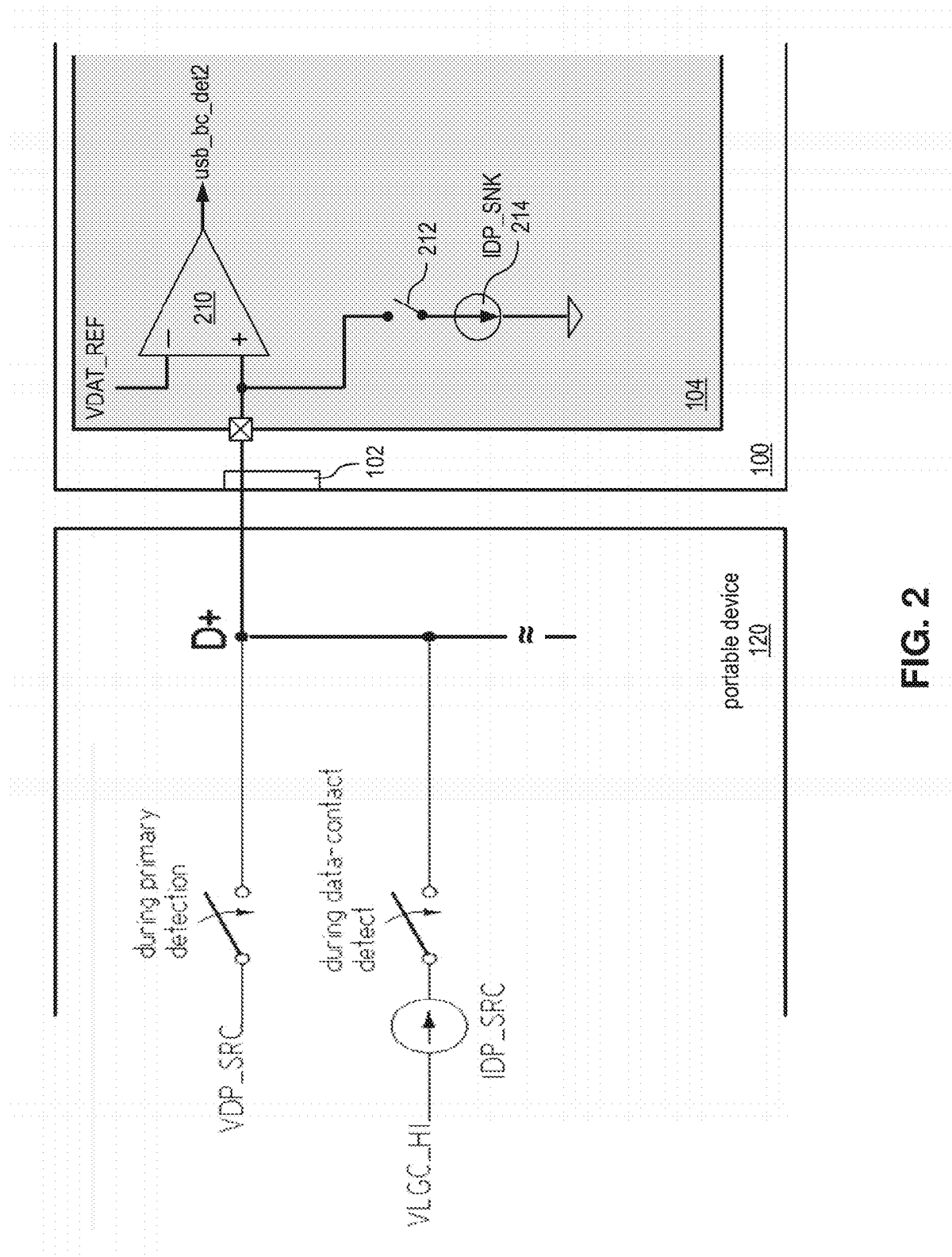
FIG. 2 illustrates an example controller configured for Level-2 detection of battery-charging compliant portable devices, according to some embodiments.

FIG. 2 illustrates an example device 100 that is configured for Level-2 detection. In various embodiments, device 100 may be the same as device 100 illustrated in FIG. 1—e.g., an apparatus such as a laptop computer, notebook computer, a docking station, a standalone USB hub, or any other similar device that is capable of charging portable devices. Similarly to FIG. 1, device 100 of FIG. 2 also includes a USB port 102 that is coupled to a controller 104. Referring to FIG. 2, USB port 102 may be a USB 2.0 or a USB 3.0 port. Controller 104 is an IC chip manufactured on a single die and is configured to control charging of portable devices through USB ports.

Among other hardware elements (e.g., such as a Level-1 detection circuit and USB traffic-processing elements), controller 104 also includes comparator 210, switch 212, and current sink 214 that are configured as a Level-2 detection circuit to perform Level-2 detection in accordance with the techniques described herein. In FIG. 2, comparator 210, switch 212, and current sink 214 are manufactured on the same die as controller 104 in order to leverage the advantages of a single-die embodiment (e.g., as discussed heretofore with respect to FIG. 1). The negative input terminal of comparator 210 is coupled to a reference VDAT_REF voltage, which per the BC1.2 specification must be between 250 mV and 400 mV. The positive input terminal of comparator 210 is coupled to the D+ line of USB port 102. Switch 212 is coupled to the D+ line of USB port 102 and to the positive input terminal of comparator 210. Current sink 214 is coupled in series with switch 212 to process an IDP_SNK current to ground. According to the BC1.2 specification, the IDP_SNK current must be between 25 μA and 175 μA.

In operation, after controller 104 detects that a BC compliant portable device 120 is attached to USB port 102, the Level-2 detection circuit is activated to confirm that the attached portable device 120 is indeed a BC compliant device. Specifically, to ensure that no spurious leakage has caused a false positive BC compliant detection, controller 104 first disables the D− and D− line termination elements that are needed to support BC non-compliant charging. Then, switch 212 is activated (closed) for 500 μs, which causes current sink 214 to process an IDP_SNK current (e.g., between 25 μA and 175 μA) to ground. Switch 212 is then de-activated (opened) to disconnect current sink 214 for 500 μs. After current sink 214 has been disconnected for 500 μs, controller 104 checks whether the output terminal ("usb_bc_det2") of comparator 210 transitions to a high signal (which would confirm that portable device 120 is BC compliant) or remains at a low signal (which would indicate that portable device 120 is BC non-compliant).

When the attached portable device 120 is BC compliant, per the BC1.2 specification the BC compliant device guarantees that the voltage on the D+ line of USB port 102 is more than 2V during data-contact-detect (e.g., when the attached portable device 120 applies an IDP_SRC current to the D+ line) and between 500 mV and 700 mV during primary BC1.2 detection (e.g., when the attached portable device 120 applies a VDP_SRC voltage to the D+ line). In both cases the voltage on the positive input terminal of comparator 210 is at least 500 mV or higher, while the VDAT_REF voltage on the negative input terminal of comparator 210 remains between 250 mV and 400 mV. Since the voltage on the negative terminal of comparator 210 is lower than the voltage on the positive input terminal, the output of comparator 210 transitions to a high output signal (e.g., a logical "1"). Controller 104 detects the transition to the high output signal (e.g., after current sink 214 has been disconnected for 500 μs) and confirms that a BC compliant device has been attached to USB port 102. This causes controller 104 to provide for a BC compliant charging current to portable device 120. For example, controller 104 may cause a power supply in device 100 to provide a charging current of a maximum of 1.5 A to portable device 120 over the VBUS line of the USB bus.

When the attached portable device 120 is BC non-compliant, the voltage on the positive input terminal of comparator 210 is close to 0V (e.g., since controller 104 has disabled the D+ and D− line termination elements), while the VDAT_REF voltage on the negative input terminal of comparator 210 remains between 250 mV and 400 mV. Thus, the voltage on the negative input terminal of comparator 210 is higher than the voltage on the positive input terminal, and as a result the output terminal of comparator 210 maintains a low output signal (e.g., a logical "0"). Controller 104 detects the lack of transition to a high output signal at the output of comparator 210 (e.g., after current sink 214 has been disconnected for 500 μs), and determines that a BC non-compliant device has been attached to USB port 102. In other words, controller 104 determines that the Level-1 detection of a BC compliant device was in error (e.g., because the Level-1 detection circuit may have been triggered by a parasitic current or leakage thereof). This causes controller 104 to provide for a BC non-compliant charging current to portable device 120. For example, controller 104 may cause a power supply in device 100 to provide a charging current of a maximum of 2.4 A to portable device 120 over the VBUS line of the USB bus.

Example Method with Level-1 and Level-2 Detections

Figure 3:
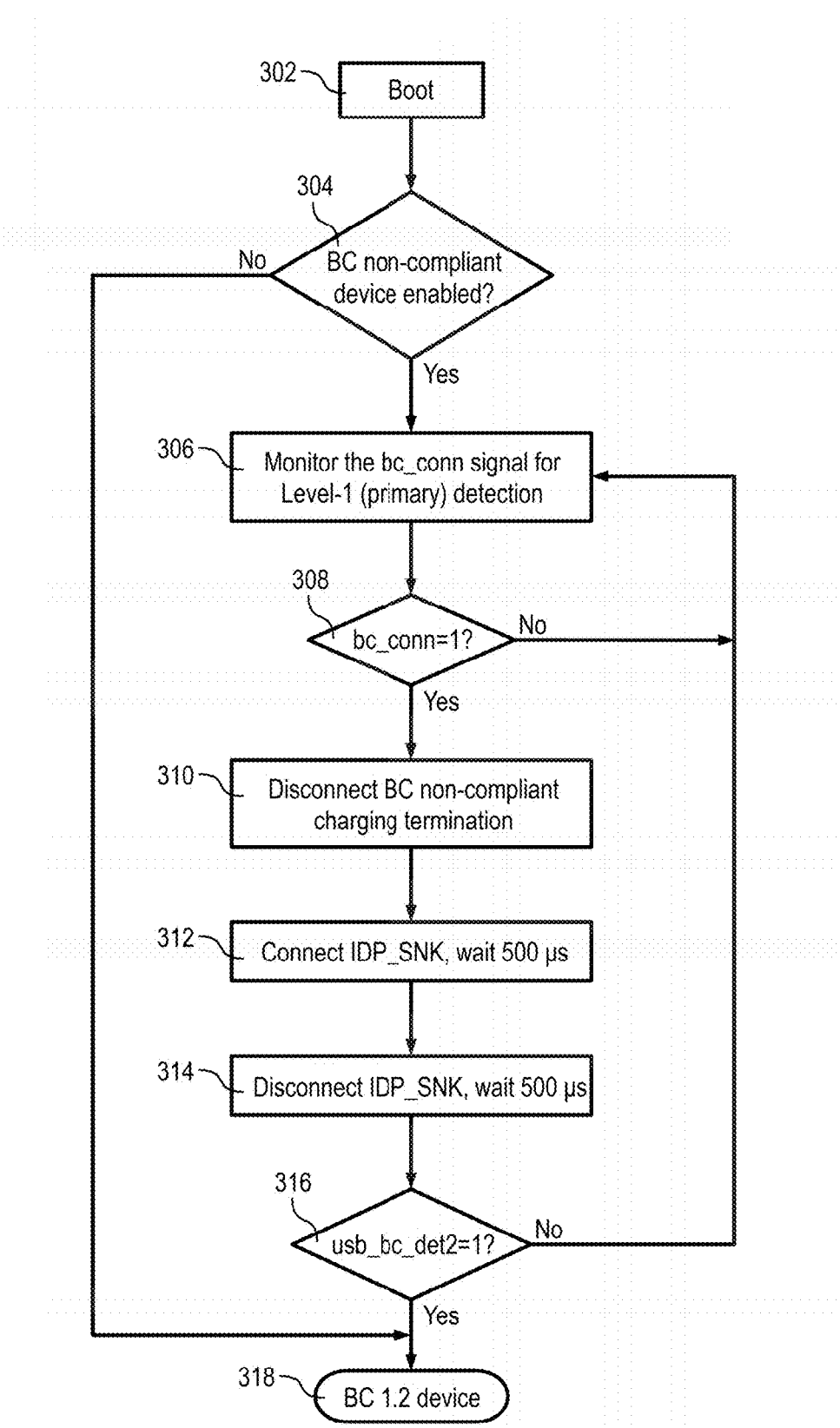
FIG. 3 illustrates an example method for detecting battery-charging compliant portable devices, according to some embodiments.

FIG. 3 is a flow diagram illustrating an example method for detecting BC compliant portable devices by using Level-1 and Level-2 detections, in accordance with some embodiments. The operations of the method in FIG. 3 are described as being performed by a hub controller (e.g., such as a USB hub controller) and/or circuits thereof. It is noted, however, that various implementations and embodiments may use various, and possibly different, components to perform the operations of the method in FIG. 3. For example, in various embodiments a system-on-chip device may be configured with firmware instructions which, when executed by one or more processors or other hardware components (e.g., microcontrollers, ASICs, and the like), are operable to perform the operations of the method in FIG. 3. In another example, in various embodiments a non-hub charging device (e.g., such as a wall/AC charger) may include a single-chip or multi-chip controller configured to perform the operations of the method in FIG. 3. Thus the description hereinafter, of the method in FIG. 3 as being performed by a hub controller and/or circuits thereof, is to be regarded in an illustrative rather than a restrictive sense.

Referring to FIG. 3, in operation 302 a hub controller is booted or is otherwise initialized and activated. In operation 304, the hub controller determines whether a default mode to charge BC non-compliant devices is enabled. For example, the hub controller determines whether its firmware configuration and/or registers specify a default mode, in which the hub controller can control the charging of BC non-compliant devices through a USB port configured as a dedicated charging port (e.g., DCP). If in operation 304 the hub controller determines that charging of BC non-compliant devices is not enabled, the hub controller proceeds to operation 318 and considers any portable device that is attached to the dedicated charging USB port as a BC compliant device. If in operation 304 the hub controller determines that charging of BC non-compliant devices is enabled, then the hub controller proceeds with operation 306.

In operations 306 and 308, the hub controller performs a Level-1 detection to determine whether a BC compliant device is attached to the dedicated charging USB port. For example, the hub controller may continuously perform data-contact-detection (e.g., as specified in the BC1.2 specification) on the USB port to determine whether a portable device is attached thereto. When the hub controller detects that a portable device is physically attached to the USB port, the hub controller proceeds with operation 306. In operation 306, the hub controller monitors whether the output (e.g., "bc_conn") of a Level-1 detection circuit transitions to a high signal. If the comparison in operation 308 does not indicate a transition to a high output signal (e.g., a logical "1"), the hub controller determines that a BC non-compliant device has been attached to the USB port. This causes the hub controller to return to operation 306. In addition, per the default mode this causes the hub controller to provide for a BC non-compliant charging current to the portable device that is attached to the USB port. For example, the hub controller may cause a power supply to provide a charging current of a maximum of 2.4 A to the portable device over the VBUS line of the USB port. If the comparison in operation 308 indicates a transition to a high signal at the output of the Level-1 detection circuit, the hub controller proceeds to perform Level-2 detection in accordance with operations 310, 312, 314, and 316.

In operation 310, the hub controller disconnects (or otherwise disables) any termination elements on the D+ and D+ lines that are used for charging BC non-compliant devices. For example, the chargers and/or charge controllers for some BC non-compliant portable devices may be required to include line termination elements (e.g., such as resistor dividers coupled between a VBUS voltage and ground) that are configured to provide on the D+/D− lines specific voltages that are measured by the BC non-compliant portable devices for the purpose of charging. According to the techniques described herein, the hub controller disconnects/disables any such termination elements since when applied they may pull-up the voltages on the D+/D− lines above the detection threshold of the Level-2 detection circuit of the hub controller.

The hub controller performs operations 312 and 314 to ensure that spurious current or leakage thereof has not caused the Level-1 detection circuit to detect a BC compliant portable device in error. Specifically, in operation 312 the hub controller activates a current sink for 500 μs to process an IDP_SNK current (e.g., between 25 μA and 175 μA) to ground. In operation 314, the hub controller deactivates/disconnects the current sink and waits for 500 μs. This ensures that any spurious charge that may have been present on the D+ line is discharged.

After the current sink on the D+ line has been disconnected for 500 μs per operation 314, in operation 316 the hub controller checks whether the output (e.g., "usb_bc_det2") of a Level-2 detection circuit transitions to a high signal. If the hub controller does not detect a transition to a high output signal, the hub controller determines that a BC compliant device has been detected in error by the Level-1 detection circuit. This causes the hub controller to return to operation 306. In addition, per the default mode this causes the hub controller to provide for a BC non-compliant charging current to the portable device that is attached to the USB port. For example, the hub controller may cause a power supply to provide a charging current of a maximum of 2.4 A to the portable device over the VBUS line of the USB port.

If in operation 316 the hub controller detects a high output signal (e.g., a logical "1") at the output of the Level-2 detection circuit, then in operation 318 the hub controller confirms that a BC compliant device has indeed been attached to the dedicated charging USB port. This causes the hub controller to provide for a BC compliant charging current to the attached portable device. For example, the hub controller may cause a power supply to provide a charging current of a maximum of 1.5 A to the portable device over the VBUS line of the USB port.

In this manner, the techniques for detecting BC compliant portable devices described herein allow the charging of BC compliant devices and of BC non-compliant devices to be performed dynamically, on-the-fly and at their maximum allowed charging currents.

BC-Compliant Disconnect Detection

In some embodiments, the techniques described herein provide for detecting whether a BC compliant device is disconnected from a downstream USB port of an apparatus, e.g., such as a hub or a docking station. After detecting the disconnection of the BC compliant device, in these embodiments the USB controller of the apparatus may switch to default mode, in which the controller may control the charging of a BC non-compliant device through the downstream USB port. This functionality is advantageous since a user may seamlessly use the same USB port on the apparatus to charge BC compliant portable device at one time and a BC non-compliant portable device at a different time.

Figure 4:
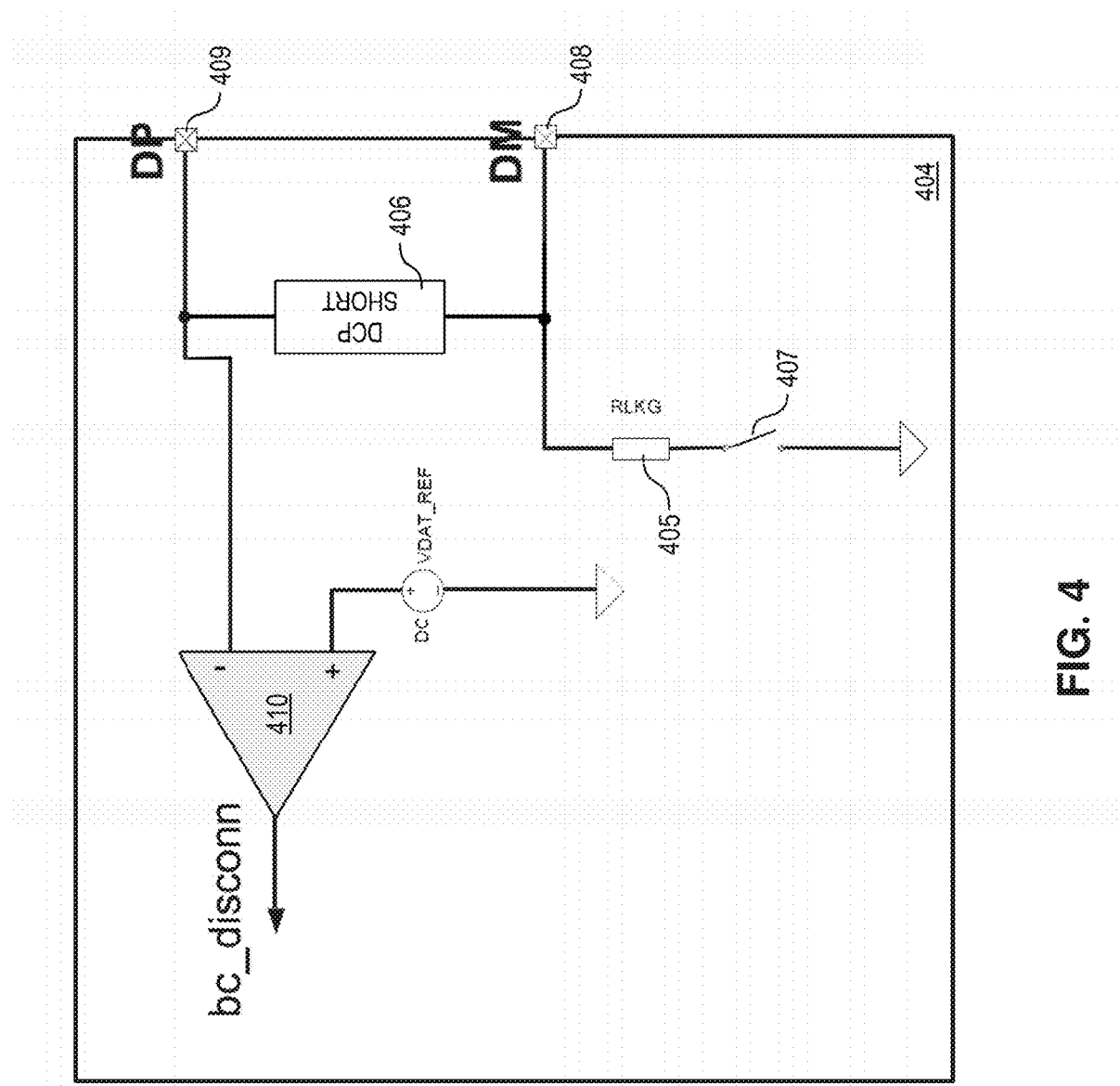
FIG. 4 illustrates an example controller configured to detect portable device disconnection, according to some embodiments.

FIG. 4 illustrates an example controller 404 that is configured to detect disconnection of BC compliant portable devices. In various embodiments, controller 404 may be the same as controller 104 illustrated in FIG. 1—e.g., a USB hub controller disposed and configured in an apparatus such as a laptop computer, notebook computer, a docking station, a standalone USB hub, or any other similar device that is capable of charging portable devices. Similarly to controller 104, controller 404 in FIG. 4 is an IC chip manufactured on a single die and is configured to control charging of portable devices through USB ports.

Among other hardware elements (e.g., such as USB traffic-processing elements), controller 404 includes a detection circuit that comprises resistor element 405, resistor element 406, switch 407, D− node 408, D+ node 409, and comparator 410. The hardware elements comprising the detection circuit are manufactured on the same die as controller 404 in order to leverage the advantages of a single-die embodiment (e.g., as discussed heretofore with respect to FIG. 1). The D− node 408 and the D+ node 409 are coupled to the D− and D+ lines, respectively, of a USB port (not shown) that is configured as dedicated charging port (e.g., as a DCP). Resistor element 405 has an impedance of approximately 500 kΩ and is coupled in series with switch 407 to ground. Resistor element 406 has an impedance of RDCP_DAT, which per the BC1.2 specification must be a maximum of 200 Ω. In accordance with the BC1.2 specification, resistor element 406 is coupled between the D− node 408 and the D+ node 409 in order to configure the USB port (not shown) as a DCP. The negative input terminal of comparator 410 is coupled to the D+ node 409, and the positive input terminal of comparator 410 is coupled to a voltage source that generates a reference VDAT_REF voltage, which per the BC1.2 specification must be between 250 mV and 400 mV.

When controller 404 operates a USB port configured as a DCP in BC compliant dedicated charging mode, the D− node 408 and the D+ node 409 are shorted through resistor element 406. As long as a BC compliant device remains attached to the D− node 408 and the D+ node 409 (e.g., over the D− and D+ lines of the USB port), the voltage on the D+ node 409 remains at VDP_SRC voltage (e.g., between 500 mV and 700 mV per the BC1.2 specification). Thus, the voltage on the negative input terminal of comparator 410 is at least 500 mV, while the VDAT_REF voltage on the positive input terminal of comparator 410 remains between 250 mV and 400 mV. Since the voltage on the negative terminal of comparator 410 is higher than the voltage on the positive input terminal, the output (e.g., "bc_disconn") of comparator 410 remains at a low output signal (e.g., a logical "0"). This low output signal from the output of comparator 410 continues as long as the BC compliant portable device remains attached to the dedicated charging USB port.

When the BC compliant portable device is disconnected from the dedicated charging USB port, the voltages on the D− node 408 and the D+ node 409 become floating. In response, controller 404 activates (closes) switch 407, which pulls down the voltage on the D− node 408 through resistor element 405 (with RLKG impedance of approximately 500 kΩ). Because of the large difference between the impedances of resistor elements 405 and 406, this operation causes the floating voltage on the D+ node 409 to drop below VDAT_REF deterministically, while at the same time ensures that the pin leakage requirements of the USB 2.0 specification are met. Controller 404 then monitors the signal on the output terminal of comparator 410. The voltage on the negative input terminal of comparator 410 drops substantially to 0V, while the VDAT_REF voltage on the positive input terminal of comparator 410 remains between 250 mV and 400 mV. Since the voltage on the negative terminal of comparator 410 is now lower than the voltage on the positive input terminal, the output (e.g., "bc_disconn") of comparator 410 transitions to a high output signal (e.g., a logical "1"). Controller 404 detects the transition to the high output signal and determines that a BC compliant portable device has been disconnected from the USB port. This causes controller 404 to perform any appropriate operations. For example, controller 404 may re-configure/transition itself into a default mode, in which the controller expects to control the charging of a BC non-compliant portable device through the USB port.

It is noted that as long as a BC non-compliant device is attached to the dedicated charging USB port, the output of comparator 410 will remain at a high output signal because a BC non-compliant portable device does not apply a VDP_SRC voltage to the D+ node 409 through the D+ line of the USB port. Thus, when a BC non-compliant portable device is disconnected from the dedicated charging USB port, the output of comparator 410 will not transition to a high output signal and thereby will not indicate to controller 404 that a BC compliant device was disconnected. As a result, controller 404 does not need to take any further action in response to the device disconnection.

Host Disconnect Detection

According to the BC1.2 specification, an apparatus operating in ACA-Dock mode is a device (e.g., such as a docking station) that has one upstream USB port and zero or more downstream USB ports. The upstream USB port can be attached to a host device, while zero or more USB peripheral (e.g., portable) devices can be attached to the downstream USB ports. When a host device is attached to the upstream USB port of an ACA-Dock device, the host device (and/or a USB controller thereof) controls the charging of portable devices attached to the downstream USB ports. However, when the host device is removed, the charging on the downstream USB ports stops even though there may still be portable devices attached thereto. For example, a docking station stops the charging of a portable device (e.g., smartphone) attached to a downstream USB port when a laptop computer is physically removed from the upstream USB port of the docking station.

To address this and other issues, in some embodiments the techniques described herein may provide for detecting the disconnection of a host device from an upstream USB port of an ACA-Dock device (e.g., a docking station or hub) based on the D+ and/or D− lines of the port, instead of based on the VBUS line as defined in the BC1.2 specification. This allows these embodiments to detect the host device disconnection when the VBUS line is asserted by the ACA-Dock device to provide power to the upstream host device. In response to detecting the disconnection of a host device from its upstream USB port, the ACA-Dock device can automatically reconfigure itself in "ghost charging" mode, in which the charging of any portable device(s) attached to the downstream USB ports can continue automatically. This functionality is advantageous since a user may use her ACA-Dock docking station to continue charging her (BC compliant or BC non-compliant) portable device even after the user removes her laptop computer from the docking station.

Figure 5:
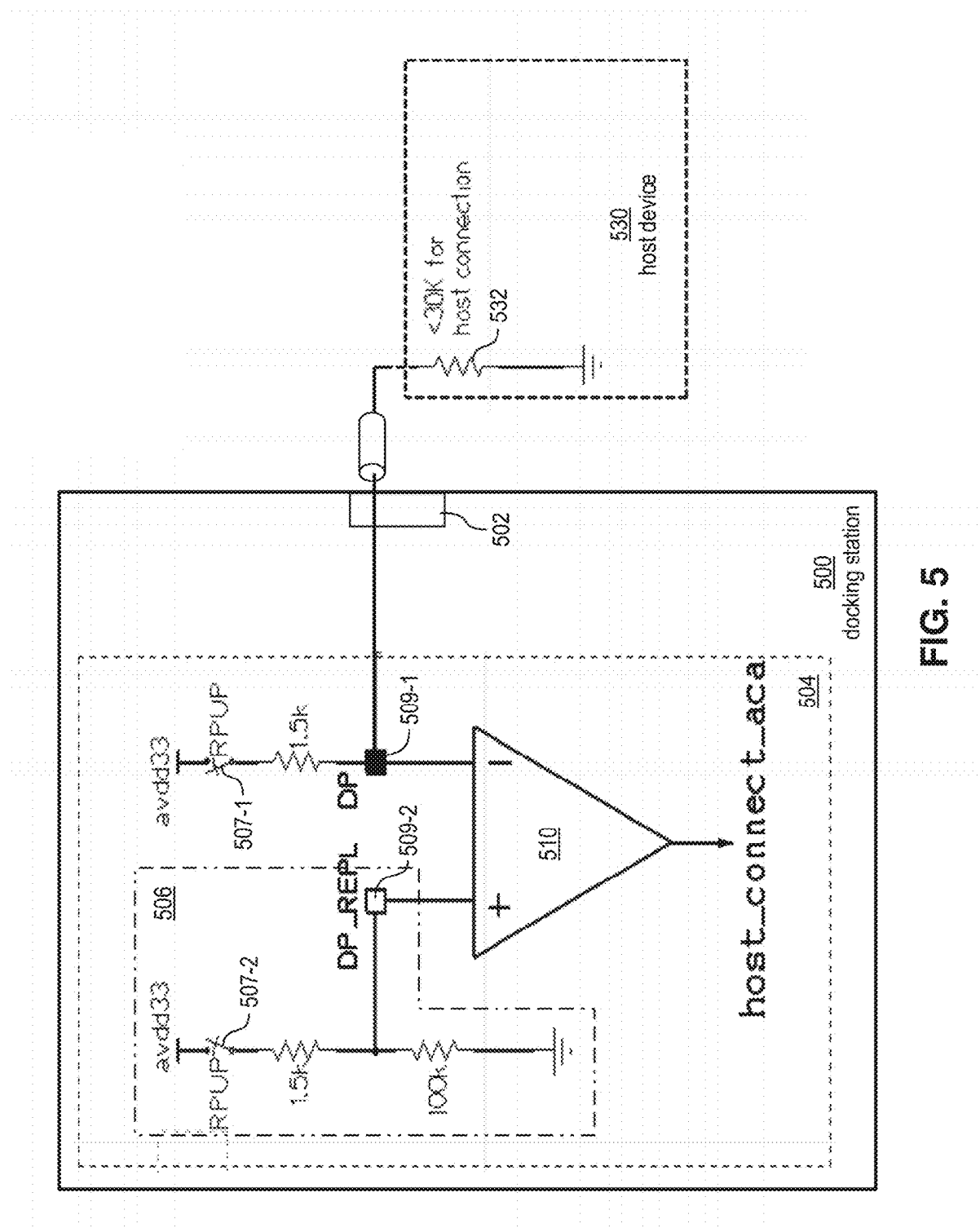
FIG. 5 illustrates an example controller configured to detect host device disconnection in ACA-Docking mode, according to some embodiments.

FIG. 5 illustrates an example device 500 (e.g., docking station) that is configured to detect host device disconnection in ACA-Dock mode. Docking station 500 includes an upstream USB port 502 that is coupled to a controller 504. Upstream USB port 502 may be a USB 2.0 or a USB 3.0 port. In various embodiments, controller 504 may be the same as controller 104 illustrated in FIG. 1—e.g., a USB hub controller disposed and configured in an apparatus such as a docking station or a USB hub. Similarly to controller 104, controller 504 in FIG. 5 is an IC chip manufactured on a single die and is configured to control charging of portable devices through USB ports.

Among other hardware elements (e.g., such as USB traffic-processing elements), controller 504 includes a host-disconnect detection circuit that comprises D+ node 509-1, termination replica 506, and comparator 510. The hardware elements comprising the host-disconnect detection circuit are manufactured on the same die as controller 504 in order to leverage the advantages of a single-die embodiment (e.g., as discussed heretofore with respect to FIG. 1). The D+ node 509-1, termination replica 506, and comparator 510 are configured in accordance with the techniques described herein to detect host disconnection in ACA-Dock mode. The D+ node 509-1 is coupled to the D+ line of USB port 502 and is configured to transmit and receive the D+ signals of a USB bus. The D+ node 509-1 is also coupled through a pull-up resistor element in series with switch 507-1 (e.g., "RPUP") to a chip-supplied analog voltage of 3.3V (e.g., "avdd33"). Termination replica 506 includes a replicated D+ node 509-2, which is coupled through a pull-up resistor element in series with switch 507-2 (e.g., "RPUP") to the same chip-supplied analog voltage of 3.3V (e.g., "avdd33"). The D+ node 509-2 is an exact hardware replica of the D+ node 509-1. For example, D+ node 509-2 includes exact copies of the same hardware elements (e.g., buffers, amplifiers, resistors, etc.) that are included in the D+ node 509-1; thus, the electrical characteristics (e.g., impedance, capacitance, leakage, etc.) of the D+ node 509-2 are matched exactly to the electrical characteristics of the D+ node 509-1. The negative input terminal of comparator 510 is coupled to the D+ node 509-1 and the positive input terminal of comparator 510 is coupled to the replicated D+ node 509-2 of termination replica 506. According to the techniques described herein, in operation the output terminal (e.g., "host_connect_aca") of comparator 510 maintains a high output signal to indicate that a host device remains connected to the USB port 502 or transitions to a low output signal to indicate that a host device is disconnected from the upstream USB port 502.

In operation, a host device 530 is connected to the upstream USB port 502. To detect the disconnection of host device 530, controller 504 uses the fact that (per the USB 2.0 specification) the host device pulls down the D+ node 509-2 through the D+ line of upstream USB port 502 with a resistor 532 of 30 kΩ or lower while the host device remains connected to the upstream USB port. As a result, while the host device remains connected to upstream USB port 502, the voltage on the D+ node 509-1 is lower than the voltage on the replicated D+ node 509-2. Thus, the voltage on the negative input terminal of comparator 510 is lower than the voltage on the positive input terminal, and the output (e.g., "host_conenct_aca") of the comparator maintains a high output signal (e.g., logical "1") to indicate that the host device 530 remains connected to the upstream USB port 502.

To detect the disconnection of host device 530 from upstream USB port 502, controller 504 waits for USB port 502 to enter a USB "Suspend" state that is achieved when no USB traffic is sent through the USB port for 3 ms. This operation ensures that no USB traffic is flowing between controller 504 and host device 530. After upstream USB port 502 enters the "Suspend" state, controller 504 activates (closes) switches 507-1 and 507-2 for the D+ node 509-1 and the replicated D+ node 509-2, respectively. If host device 530 is still connected to upstream USB port 502, the pull down on the D+ line through the 30 kΩ resistor 532 ensures that the voltage on the D+ node 509-1 is lower than the voltage of on the replicated D+ node 509-2. Thus, the voltage on the negative input terminal of comparator 510 remains lower than the voltage on the positive input terminal, and the output terminal (e.g., "host_connect_aca") of comparator 510 maintains a high output signal (e.g., logical "1") to indicate that the host device remains connected to the upstream USB port 502. Controller 504 detects the lack of transition to the low output signal and determines that host device 530 remains connected to upstream USB port 502. This causes controller 504 to operate one or more downstream USB ports as communication USB ports (e.g., SDP or CDP). For example, controller 504 may continue to operate a given (e.g., SDP or CDP) downstream port as a communication USB port. Alternatively, controller 504 may re-configure a given (e.g., DCP) downstream port as a communication USB port.

However, if host device 530 was physically disconnected from upstream USB port 502, there is no pull-down on the D+ line of the USB port and the voltage on the D+ node 509-1 is pulled higher than the voltage of on the replicated D+ node 509-2. Thus, the voltage on the negative input terminal of comparator 510 becomes higher than the voltage on the positive input terminal, and the output terminal (e.g., "host_connect_aca") of comparator 510 transitions to a low output signal (e.g., logical "0") to indicate that host device 530 was disconnected from the upstream USB port 502. Controller 504 detects the transition to the low output signal and determines that host device 530 has been disconnected from upstream USB port 502. This causes controller 504 to operate one or more downstream USB ports as dedicated charging ports (e.g., DCPs). For example, controller 504 may re-configure a given communication (e.g., SDP or CDP) downstream port as a dedicated charging USB port (e.g., DCP) in order to ensure that any (BC compliant or BC non-compliant) portable device that is still (or will be) attached thereto can be charged.

Figure 6:
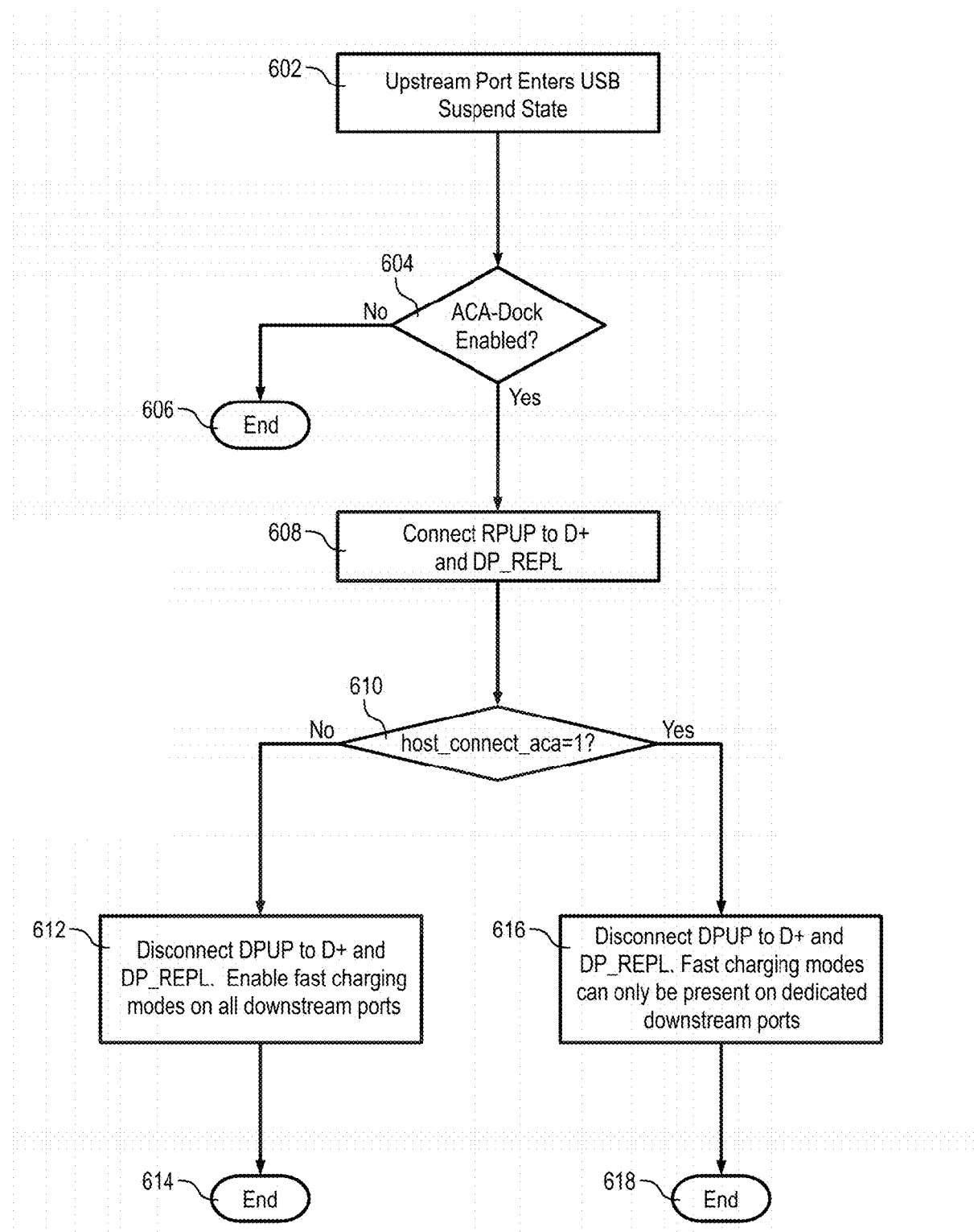
FIG. 6 illustrates an example method for detecting host device disconnection in ACA-Docking mode, according to some embodiments.

FIG. 6 is a flow diagram illustrating an example method for detecting host device disconnection in ACA-Dock mode, in accordance with some embodiments. The operations of the method in FIG. 6 are described as being performed by a controller such as controller 504 in FIG. 5. It is noted, however, that various implementations and embodiments may use various, and possibly different, components to perform the operations of the method in FIG. 6. For example, in various embodiments a system-on-chip device may be configured with firmware instructions which, when executed by one or more processors or other hardware components (e.g., microcontrollers, ASICs, and the like), are operable to perform the operations of the method in FIG. 6. In another example, in various embodiments a docking station device may include a single-chip or multi-chip controller configured to perform the operations of the method in FIG. 6. Thus the description hereinafter, of the method in FIG. 6 as being performed by a controller, is to be regarded in an illustrative rather than a restrictive sense.

Referring to FIG. 6, in operation 602 a controller waits for an upstream USB port to enter a USB "Suspend" state that is achieved when no USB traffic is sent through the USB port for 3 ms. This operation ensures that no USB traffic is flowing between the controller and a host device connected to the upstream USB port. After the controller detects that the upstream USB port has entered the "Suspend" state, the controller proceeds with operation 604.

In operation 604, the controller determines whether ACA-Dock mode is enabled. For example, the controller determines whether it is configured to operate a docking station in ACA-Dock mode in accordance with the BC1.2 specification. If in operation 604 the controller determines that ACA-Dock mode is not enabled, the controller proceeds to operation 606 to end the host detection process and to continue with other operations (if any). If in operation 604 the hub controller determines that ACA-Dock mode is enabled, then the controller proceeds with operation 608.

In operation 608, the controller pulls up the voltage on both the D+ node and the replicated D+ node (e.g., "DP_REPL"). For example, the controller may activate (close) switches on both the D+ node and the replicated D+ node to connect these nodes to a chip-supplied analog voltage through respective resistor elements that have the same impedance. If a host device is still connected to the upstream USB port, the voltage on the D+ node is lower than the voltage of on the replicated D+ node. However, if a host device is no longer physically connected to the upstream USB port, the voltage on the D+ node is higher than the voltage of on the replicated D+ node. The voltage on the D+ node is coupled to the negative input terminal of a comparator, while the voltage on the replicated D+ node is coupled to the positive input terminal of the comparator. The controller then proceeds to monitor the output (e.g., "host_connect_aca") of the comparator, and in operation 610 the controller performs a comparison to determine whether the output of the comparator remains at a high output signal (e.g., a logical "1").

If in operation 610 the controller detects that the output of the comparator remains at the high output signal, the controller determines that a host device remains connected to the upstream USB port. The controller then proceeds with operations 616 and 618. In operation 616, the controller disconnects/deactivates (opens) the switches that were used to pull up the voltages on the D+ node and the replicated D+ node. The controller then operates fast charging modes only on those downstream USB ports that have been previously configured as DCP or CDP ports. (As used herein, "fast-charging" refers to an operational mode in which USB data connectivity through a USB port is not required, but a portable device attached thereto can draw charging current of 1 A or higher from the VBUS line of the USB port.) The controller then proceeds with operation 618 to end the host detection process and to continue with other operations (if any).

If in operation 610 the controller detects that the output of the comparator transitions to a low output signal, the controller determines that a host device is no longer physically connected to the upstream USB port. The controller then proceeds with operations 612 and 614. In operation 612, the controller disconnects/deactivates (opens) the switches that were used to pull up the voltages on the D+ node and the replicated D+ node. The controller then enables fast charging modes on all downstream USB ports. For example, the controller may reconfigure any communication USB ports (e.g., SDP or CDP) to dedicated charging USB ports (e.g., DCPs), so that any (BC compliant or BC non-compliant) portable device that is still attached or will be later attached to these ports can be charged in a fast charging mode. The controller then proceeds with operation 614 to end the host detection process and to continue with other operations (if any).

In this manner, the techniques for detecting host device disconnection in ACA-Dock mode described herein allow any downstream USB port to behave as a dedicated charging port (DCP) even in ACA-Dock mode after a host device is disconnected from the upstream port.

Example Alternative Embodiments

In some embodiments, the techniques for Level-1 detection of BC compliant portable devices may be alternatively implemented by using a replica voltage source. For example, FIG. 7 illustrates such alternative embodiment.

Figure 7:
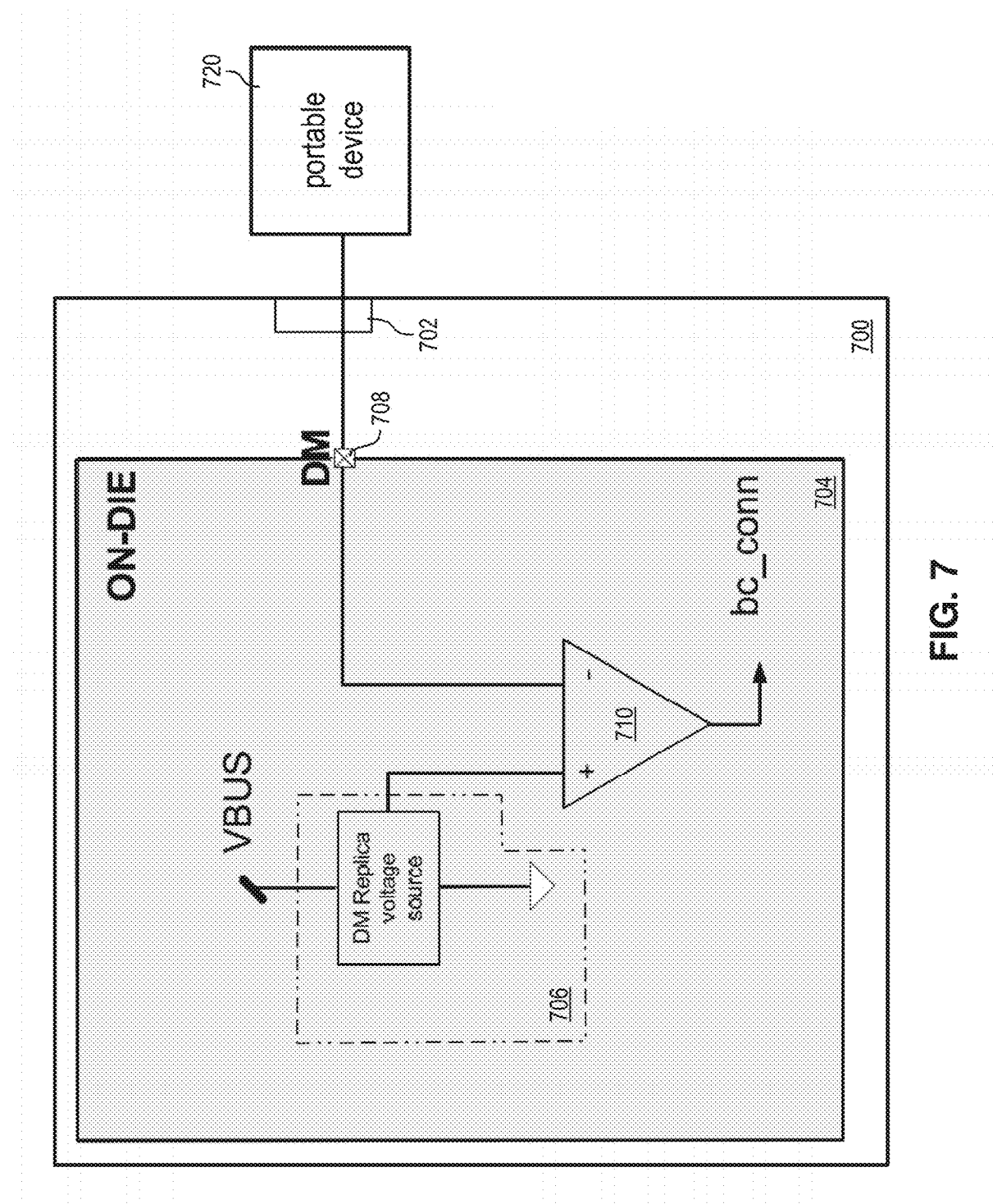
FIG. 7 illustrates an example controller configured for Level-1 detection of battery-charging compliant portable devices, according to some embodiments.

FIG. 7 illustrates an example device 700 that is configured for Level-1 detection. Device 700 may be an apparatus such as a laptop computer, notebook computer, a docking station, a standalone USB hub, or any other similar device that is capable of charging portable devices. Device 700 includes a USB port 702 that is coupled to controller 704. USB port 702 may be a USB 2.0 or a USB 3.0 port. In various embodiments, controller 704 may be an IC chip manufactured on a single die or may be a multi-chip module that is configured to control charging of portable devices through USB ports.

Among other hardware elements needed to process USB traffic, controller 704 also includes a Level-1 detection circuit that comprises D− node 708, D− replica voltage source 706, and comparator 710. The D− node 708 is coupled to the D− line of USB port 702 and is configured to transmit and receive the D− signals of a USB bus. The negative input terminal of comparator 710 is coupled to the D− node 708, and the positive input terminal of comparator 710 is coupled to the D− replica voltage source 706. The D− replica voltage source 706 includes a (possibly programmable) voltage source that is configured to apply a selected voltage to the positive input terminal of comparator 710.

In operation, controller 704 may be configured in a default mode that is specified in the firmware configuration and/or registers of the controller. In the default mode, USB port 702 is configured as a dedicated charging port (DCP) and, when no device is attached to USB port 702, the D− replica voltage source 706 provides such voltage on the positive input terminal of comparator 710 that is lower than the voltage on the D− node 708. As a result, in the default mode comparator 710 maintains a low output signal (e.g., a logical "0") at its output terminal. When a portable device 720 is attached to USB port 702, controller 704 detects the attachment and performs Level-1 detection according to the techniques described herein.

Specifically, when the attached portable device 720 is BC compliant, the voltage on the D− node 708 is pulled lower than the voltage applied by the D− replica voltage source 706 to the positive input terminal of comparator 710. As a result, the output of comparator 710 transitions to a high output signal (e.g., a logical "1"). Controller 704 detects the transition to the high output signal and determines that a BC compliant device has been attached to USB port 702. This causes controller 704 to provide for a BC compliant charging current to portable device 720. For example, controller 704 may cause a power supply in device 700 to provide a charging current of a maximum of 1.5 A to portable device 720 over the VBUS line of the USB bus.

When the attached portable device 720 is BC non-compliant, the voltage on the D− node 708 stays higher than the voltage applied by the D− replica voltage source 706 to the positive input terminal of comparator 710. As a result, the output of comparator 710 maintains a low output signal (e.g., a logical "0"). Controller 704 detects the lack of transition to a high output signal at the output of comparator 710, and determines that a BC non-compliant device has been attached to USB port 702. This causes controller 704 to provide for a BC non-compliant charging current to portable device 720. For example, controller 704 may cause a power supply in device 700 to provide a charging current of a maximum of 2.4 A to portable device 720 over the VBUS line of the USB bus.

In some embodiments, the techniques for detecting host disconnection in ACA-Dock mode may be alternatively implemented by using a replica voltage source. For example, FIG. 8 illustrates such alternative embodiment.

Figure 8:
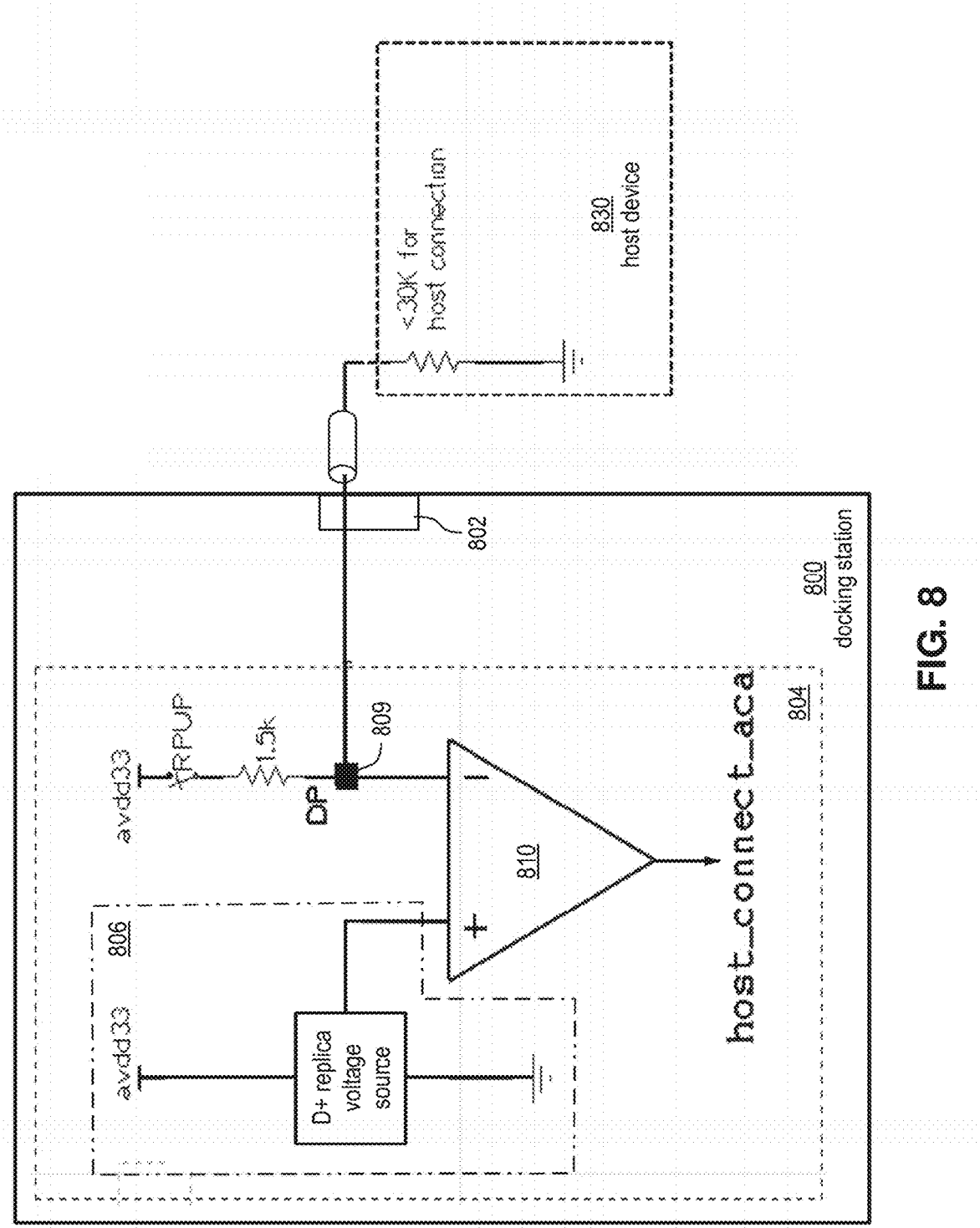
FIG. 8 illustrates an example controller configured to detect host device disconnection in ACA-Docking mode, according to some embodiments.

FIG. 8 illustrates an example device 800 (e.g., docking station) that is configured to detect host device disconnection in ACA-Dock mode. Docking station 800 includes an upstream USB port 802 that is coupled to a controller 804. Upstream USB port 802 may be a USB 2.0 or a USB 3.0 port. In various embodiments, controller 804 may be an IC chip manufactured on a single die or may be a multi-chip module that is configured to control charging of portable devices through USB ports.

Among other hardware elements (e.g., such as USB traffic-processing elements), controller 804 includes D+ node 809, D+ replica voltage source 806, and comparator 810, which are configured as a host-disconnect detection circuit to detect host disconnection in ACA-Dock mode. The D+ node 809 is configured to transmit and receive the D+ signals of a USB bus. The D+ node 809 is coupled through a switch to a chip-supplied analog voltage of 3.3V (e.g., "avdd33"). Termination replica 806 is also coupled to the same chip-supplied analog voltage of 3.3V (e.g., "avdd33"). The negative input terminal of comparator 810 is coupled to the D+ node 809 and the positive input terminal of comparator 810 is coupled to a voltage output of the D+ replica voltage source 806. The D+ replica voltage source 806 includes a (possibly programmable) voltage source that is configured to apply a selected voltage to the positive input terminal of comparator 810.

In operation, a host device 830 is connected to the upstream USB port 802. While host device 830 remains connected to upstream USB port 802, the voltage on the D+ node 809 is lower than the voltage applied by the D+ replica voltage source 806 to the positive input terminal of comparator 810. Thus, the voltage on the negative input terminal of comparator 810 is lower than the voltage on the positive input terminal, and the output (e.g., "host_conenct_aca") of the comparator maintains a high output signal (e.g., logical "1") to indicate that the host device 830 remains connected to the upstream USB port 802.

To detect the disconnection of host device 830 from upstream USB port 802, controller 804 waits for USB port 802 to enter a USB "Suspend" state that is achieved when no USB traffic is sent through the USB port for 3 ms. This operation ensures that no USB traffic is flowing between controller 804 and host device 830 while the detection is in progress. After upstream USB port 802 enters the "Suspend" state, controller 804 pulls up the voltage on the D+ node 809. If host device 830 is still connected to upstream USB port 802, the voltage on the D+ node 809 is lower than the voltage applied by the D+ replica voltage source 806 to the positive input terminal of comparator 810. Thus, the voltage on the negative input terminal of comparator 810 remains lower than the voltage on the positive input terminal, and the output terminal (e.g., "host_connect_aca") of comparator 810 maintains a high output signal (e.g., logical "1") to indicate that the host device remains connected to the upstream USB port 802. Controller 804 detects the lack of transition to the low output signal and determines that host device 830 remains connected to upstream USB port 802. This causes controller 804 to operate one or more downstream USB ports as communication USB ports (e.g., SDP or CDP). For example, controller 804 may continue to operate a given (e.g., SDP or CDP) downstream port as a communication USB port. Alternatively, controller 804 may re-configure a given (e.g., DCP) downstream port as a communication USB port.

However, if host device 830 was physically disconnected from upstream USB port 802, the voltage on the D+ node 809 is pulled higher than the voltage applied by the D+ replica voltage source 806 to the positive input terminal of comparator 810. Thus, the voltage on the negative input terminal of comparator 810 becomes higher than the voltage on the positive input terminal, and the output terminal (e.g., "host_connect_aca") of comparator 810 transitions to a low output signal (e.g., logical "0") to indicate that host device 830 was disconnected from the upstream USB port 802. Controller 804 detects the transition to the low output signal and determines that host device 830 has been disconnected from upstream USB port 802. This causes controller 804 to operate one or more downstream USB ports as dedicated charging ports (e.g., DCPs). For example, controller 804 may re-configure a given communication (e.g., SDP or CDP) downstream port as a dedicated charging USB port (e.g., DCP) in order to ensure that any (BC compliant or BC non-compliant) portable device that is still (or will be) attached thereto can be charged.

Example Operational Contexts and Features

Figure 9A:
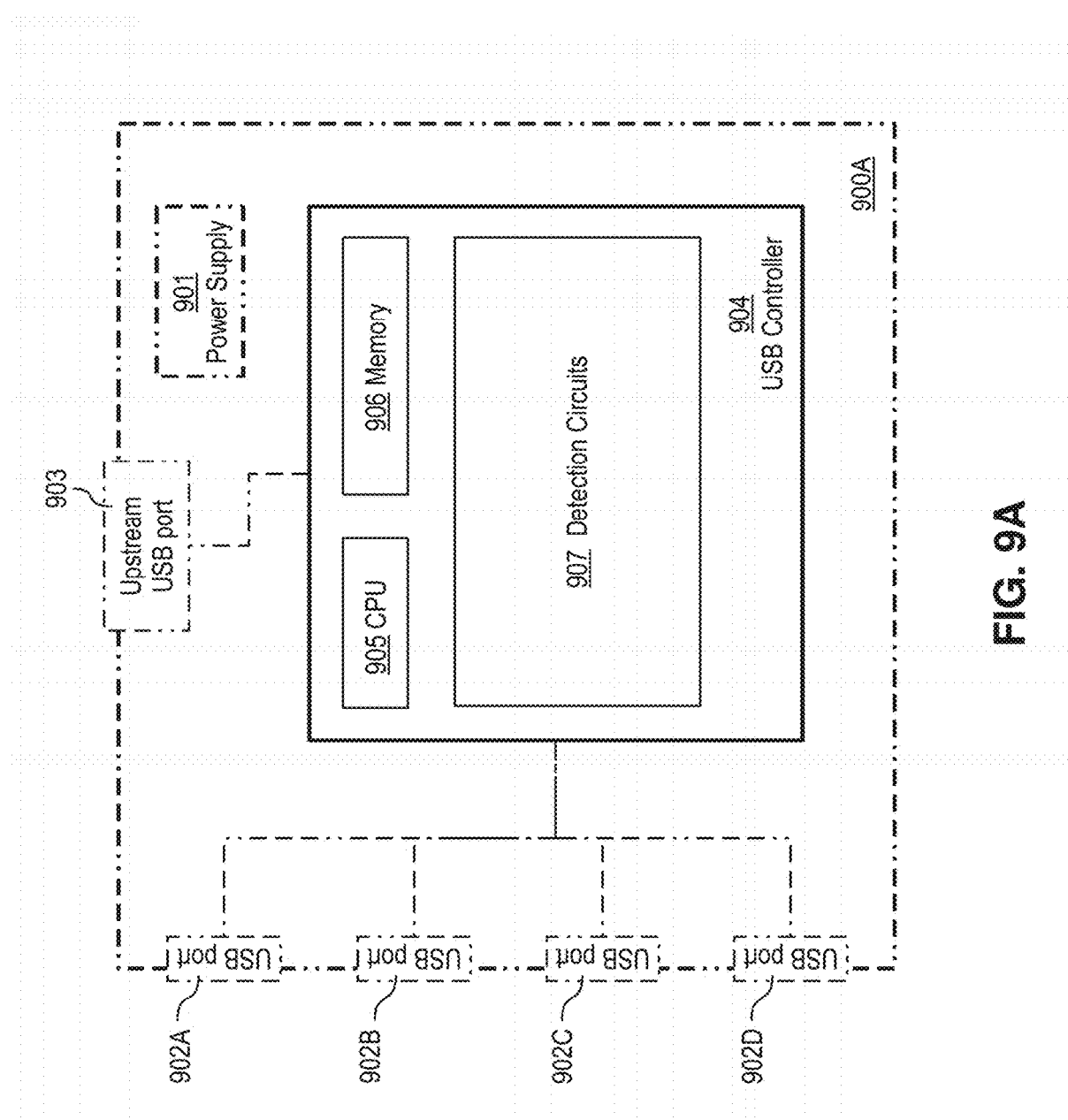
FIG. 9A illustrates an on-die USB controller that can be configured in a charging device in accordance with various embodiments.

FIGS. 9A-9E illustrate example operational contexts in which the techniques described herein for controlling the charging of portable devices may be implemented. For example, FIG. 9A illustrates a single-die USB controller that can be configured in a charging device in accordance with various embodiments.

Referring to FIG. 9A, USB controller 904 is disposed and configured to operate in a charging device 900A. Charging device 900A may be an apparatus such as a laptop or notebook computer, a docking station, a USB hub, a wall (or AC) charger, or any other similar device that is capable of charging portable devices. Device 900A includes power supply 901 and four downstream USB ports 902A, 902B, 902C, and 902D that are coupled to USB controller 904. Each of USB ports 902A, 902B, 902C, and 902D may be a USB 2.0 or a USB 3.0 port. Device 900A may also include an upstream USB port 903, which may be a USB 2.0 or a USB 3.0 port.

USB controller 904 includes central processing unit (CPU) 905, memory 906, and detection circuits 907. Memory 906 may include volatile memory, non-volatile memory, and/or any other type of storage that is suitable for storing executable software and/or firmware instructions, configuration information, and data. CPU 905 is configured to execute instructions (e.g., stored in memory 906) in order to facilitate the operation of USB controller 904.

USB controller 904 is configured to perform all of the techniques for controlling the charging of portable devices described herein. Specifically, detection circuits 907 include: one or more Level-1 detection circuits that are configured to perform Level-1 detection as described heretofore; one or more Level-2 detection circuits that are configured to perform Level-2 detection as described heretofore; one or more detection circuits that are configured to detect the disconnection of BC compliant devices from a dedicated charging USB port as described heretofore; and one or more host-disconnect detection circuits that are configured to detect host disconnection from upstream USB ports in ACA-Dock mode as described heretofore. In this manner, USB controller 904 can provide dynamic on-the-fly detection of connect and disconnect of BC compliant devices, which allows charging device 900A to support BC compliant as well as BC non-compliant fast charging modes without using downstream USB ports that are manufactured specifically to each type. USB controller 904 also provides for detection of host device disconnection independent of the VBUS line of an upstream USB port when charging device 900A operates in ACA-Dock mode, which allows the charging device to configure all downstream USB ports as fast dedicated charging ports dynamically when host disconnection is detected.

It is noted that while all of detection circuits 907 may be included in USB controller 904, only some but not all of these detection circuits may be enabled in any given embodiment of charging device 900A.

For example, FIG. 9B illustrates a laptop computer 900B that includes USB controller 904 and two downstream USB ports 902A and 902B. In the embodiment of FIG. 9B, USB controller 904 is configured as a USB hub that can provide BC compliant and BC non-compliant charging of portable devices on USB ports 902A and 902B, in accordance with the techniques described herein. In the embodiment of FIG. 9B, however, laptop computer 900B does not provide for an upstream USB port and cannot operate in ACA-Dock mode, so host-disconnect detection in ACA-Dock mode may be disabled in USB controller 904.

In another example, FIG. 9C illustrates a docking station 900C that includes USB controller 904, three downstream USB ports 902A, 902B, and 902C, and an upstream USB port 903 that is provided through a specialized docking connector. In the embodiment of FIG. 9C, USB controller 904 is configured as a USB hub that can provide BC compliant and BC non-compliant charging of portable devices on USB ports 902A, 902B, and 902C (e.g., when a host device such as a laptop computer is connected to the upstream USB port 903), in accordance with the techniques described herein. In the embodiment of FIG. 9C, docking station 900C is also configured to operate in ACA-Dock mode, so USB controller 904 is also configured to perform host-disconnect detection in ACA-Dock mode in accordance with the techniques described herein.

Figure 9E:
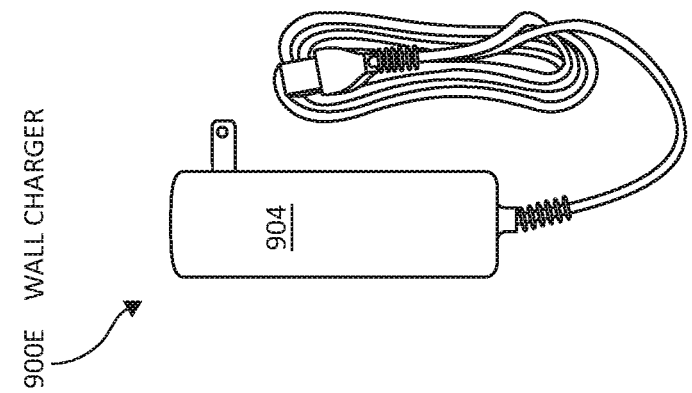
Figure 9D:
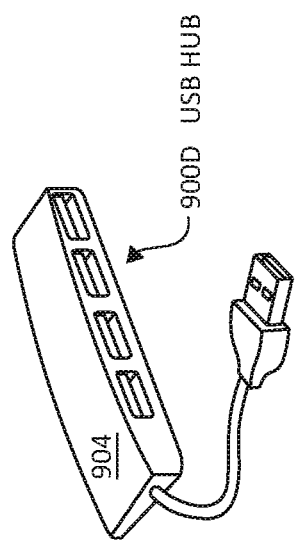

In another example, FIG. 9D illustrates USB hub 900D that includes USB controller 904 and four downstream USB ports. In the embodiment of FIG. 9D, USB controller 904 is configured as a USB hub that can provide BC compliant and BC non-compliant charging of portable devices on the downstream USB ports, in accordance with the techniques described herein. In the embodiment of FIG. 9D, however, USB hub 900D does not provide an upstream USB port and thus cannot operate in ACA-Dock mode, so host-disconnect detection in ACA-Dock mode may be disabled in USB controller 904.

In another example, FIG. 9E illustrates wall charger 900E that includes USB controller 904 and one downstream USB port. In the embodiment of FIG. 9E, USB controller 904 is configured to provide BC compliant or BC non-compliant charging on its downstream USB port depending on the type of the portable device attached thereto, in accordance with the techniques described herein. In the embodiment of FIG. 9E, however, wall charger 900E does not provide an upstream USB port and thus cannot operate in ACA-Dock mode, so host-disconnect detection in ACA-Dock mode may be disabled in USB controller 904.

Various embodiments of the techniques for controlling the charging of portable devices described herein may include various operations. These operations may be performed and/or controlled by hardware components, firmware, and/or combinations thereof. As used herein with respect to portable devices, the distinction between the terms "attach" and "connect" is preserved similarly as in the BC1.2 specification. Specifically, a portable device is considered to be "attached" to a USB port when there is a physical cable (or link) between the two. A portable device is considered to be "connected" to a USB port when it is attached to the port and: (1) it has pulled either the D+ or D− line through a 1.5 kΩ resistor in order to enter Low-Speed, Full-Speed, or High-Speed signaling (for USB 2.0 ports); or (2) when a downstream SuperSpeed termination has been detected at the upstream port (for USB 3.0/3.1 ports). As used herein, the term "coupled to" may mean coupled directly or indirectly through one or more intervening components. Any of the signals provided over various on-die buses described herein may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium, e.g., such as volatile memory and/or non-volatile memory. These instructions may be used to program one or more devices that include one or more general-purpose or special-purpose processors (e.g., such as CPUs) or equivalents thereof (e.g., such as processing cores, processing engines, microcontrollers, and the like), so that when executed by the processor(s) or the equivalents thereof, the instructions cause the device(s) to perform the described operations for controlling the charging of portable devices described herein. A computer-readable medium may also include one or more mechanisms for storing or transmitting information in a form (e.g., software, processing application, etc.) that is readable by a machine (e.g., such as a device or a computer). The non-transitory computer-readable storage medium may include, but is not limited to, electromagnetic storage medium (e.g., floppy disks, hard disks, and the like), optical storage medium (e.g., CD-ROM), magneto-optical storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the method(s) herein are shown and described in a particular order, in some embodiments the order of the operations of each method may be altered so that certain operations may be performed in an inverse order or so that certain operation may be performed, at least in part, concurrently and/or in parallel with other operations. In other embodiments, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
   an Universal Serial Bus (USB) port that is configured as a dedicated charging port; and
   a controller coupled to the USB port, the controller configured at least to:
   detect whether a battery-charging (BC) compliant device or a BC non-compliant device is attached to the USB port based on whether or not a current sink is activated on a data line of the USB port;
   control charging of the BC compliant device when the BC compliant device is detected; and
   control charging of the BC non-compliant device, when the BC non-compliant device is detected, by allowing an average charging current that is higher than 1.8 A.

2. The apparatus of claim 1, wherein the controller comprises a first circuit configured to detect whether the BC compliant device or the BC non-compliant device is attached to the USB port, the first circuit including a replica node of on-die elements that terminate a D− line of the USB port.

3. The apparatus of claim 2, wherein the first circuit includes a voltage source.

4. The apparatus of claim 2, wherein the controller further comprises a second circuit configured to confirm detection of the BC compliant device when the first circuit detects that the BC compliant device is attached to the USB port.

5. The apparatus of claim 4, wherein the second circuit is configured to:
   disconnect components, coupled at least to the D+ line, that are configured to support BC non-compliant device charging; and
   connect a current sink to the D+ line to discharge any spurious charge thereon.

6. The apparatus of claim 1, wherein the controller is an integrated circuit (IC) in a single-die chip.

7. The apparatus of claim 1, wherein the controller comprises a disconnect circuit configured to detect a disconnection of the BC compliant device from the USB port, the disconnect circuit comprising a switch coupled between a ground and a D− line of the USB port.

8. The apparatus of claim 1, further comprising a docking station, wherein the docking station includes an upstream USB port and the USB port as a downstream USB port, and wherein the controller comprises a detection circuit configured to detect whether a host device is disconnected from the upstream USB port independently of the status of a VBUS line of the upstream USB port.

9. The apparatus of claim 8, wherein the controller is further configured to:
   re-configure the USB port as a communication USB port when the host device is connected to the upstream USB port; and
   re-configure the USB port as the dedicated charging port when the host device is disconnected from the upstream USB port.

10. The apparatus of claim 8, wherein the detection circuit includes a replica node of on-die elements that terminate a D+ line of the upstream USB port.

11. A device comprising:
    a first circuit configured to detect whether a battery-charging (BC) compliant device or a BC non-compliant device is attached to a Universal Serial Bus (USB) port based on whether or not a current sink is activated on a data line of the USB port, wherein the USB port is configured as a dedicated charging port; and
    a charging circuit configured to control:
    charging of the BC compliant device, when the BC compliant device is detected; and
    charging of the BC non-compliant device, when the BC non-compliant device is detected, by providing an average charging current that is higher than 1.8 A.

12. The device of claim 11, wherein the device is an integrated circuit (IC) on a single-die chip.

13. The device of claim 11, wherein the first circuit includes a voltage source coupled to a replica node of on-die elements that terminate a D− line of the USB port.

14. The device of claim 11, further comprising a second circuit configured to confirm detection of the BC compliant device when the first circuit detects that the BC compliant device is attached to the USB port, wherein the second circuit is configured to:
    disconnect components, coupled at least to the D+ line, that are configured to support BC non-compliant device charging; and
    connect a current sink to the D+ line to discharge any spurious charge thereon.

15. The device of claim 11, further comprising a detection circuit configured to detect a disconnection of the BC compliant device from the USB port, the detection circuit comprising a switch coupled between a ground and a D− line of the USB port.

16. The device of claim 11, further comprising:
    a detection circuit configured to detect whether a host device is disconnected from an upstream USB port, the detection circuit including a replica node of on-die elements that terminate a D+ line of the upstream USB port; and
    a re-configuration circuit configured to:
    re-configure the USB port as a communication USB port when the host device is connected to the upstream USB port; and
    re-configure the USB port as the dedicated charging port when the host device is disconnected from the upstream USB port.

17. A method comprising:
    detecting, by a controller, whether a battery-charging (BC) compliant device or a BC non-compliant device is attached to a Universal Serial Bus (USB) port based on whether or not a current sink is activated on a data line of the USB port, wherein the USB port is configured as a dedicated charging port;
    charging the BC compliant device when the BC compliant device is detected; and
    charging the BC non-compliant device when the BC non-compliant device is detected, by providing an average charging current that is higher than 1.8 A.

18. The method of claim 17, further comprising confirming detection of the BC compliant device when the controller detects that the BC compliant device is attached to the USB port, wherein confirming the detection of the BC compliant device includes:
- disconnecting components, coupled at least to a D+ line of the USB port, that are configured to support BC non-compliant device charging;
- connecting a current sink to the D+ line and waiting a first time interval; and
- disconnecting the current sink from the D+ line and waiting a second time interval.

19. The method of claim 17, further comprising detecting, by the controller, a disconnection of the BC compliant device from the USB port.

20. The method of claim 17, further comprising:
- detecting, by the controller, whether a host device is disconnected from an upstream USB port independently of the status of a VBUS line of the upstream USB port;
- re-configuring the USB port as a communication USB port when the host device is connected to the upstream USB port; and
- re-configuring the USB port as the dedicated charging port when the host device is disconnected from the upstream USB port.

* * * * *